Jan. 2, 1940.  A. B. CARR ET AL  2,185,399
WINDING MACHINE
Filed May 19, 1938  11 Sheets-Sheet 1
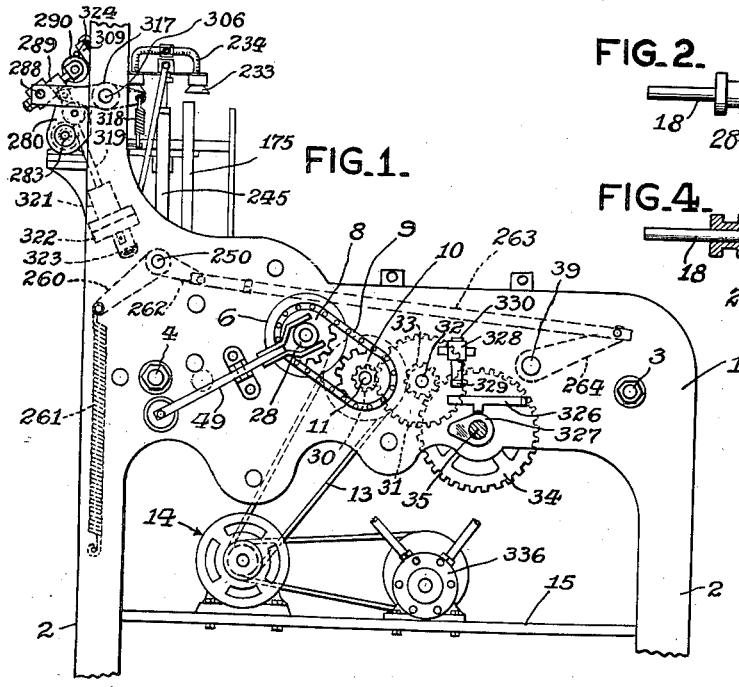
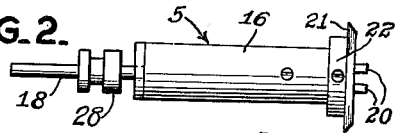
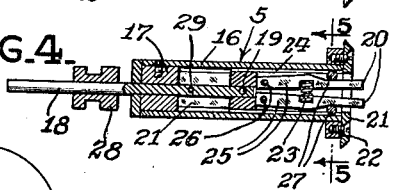
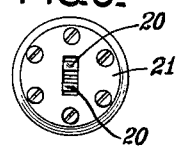
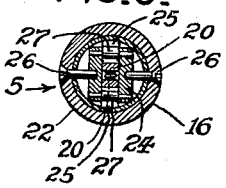
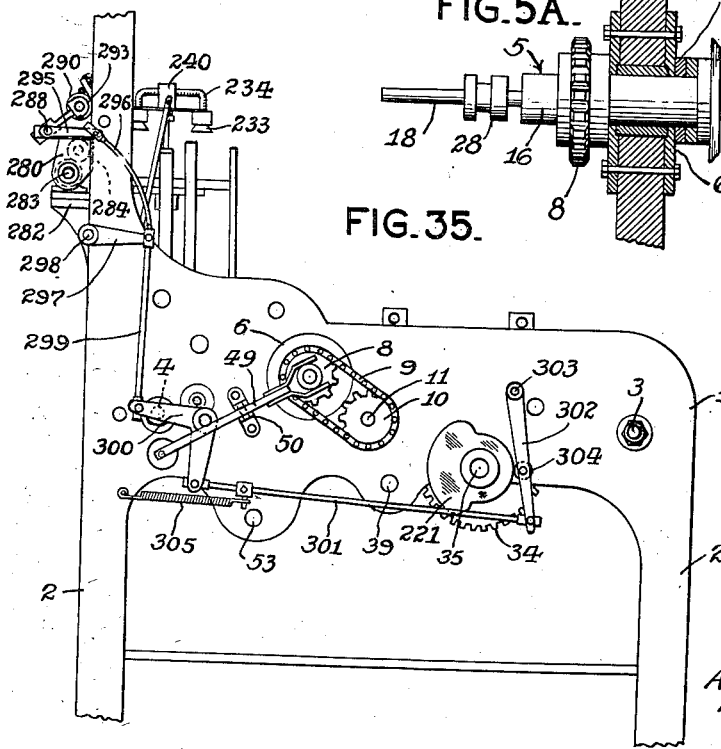
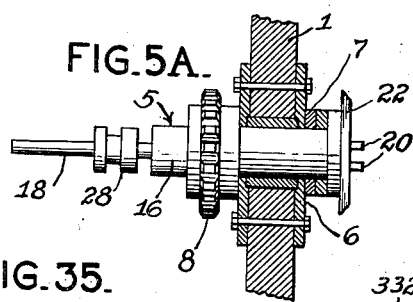
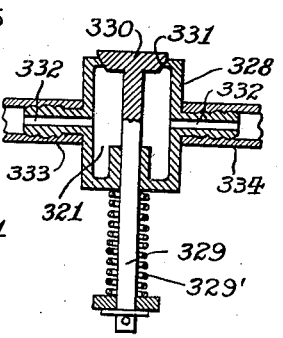
INVENTORS
ALBERT B. CARR.
ROBERT H. FLUKER.
BY Ward Crosby &nel
their ATTORNEYS.

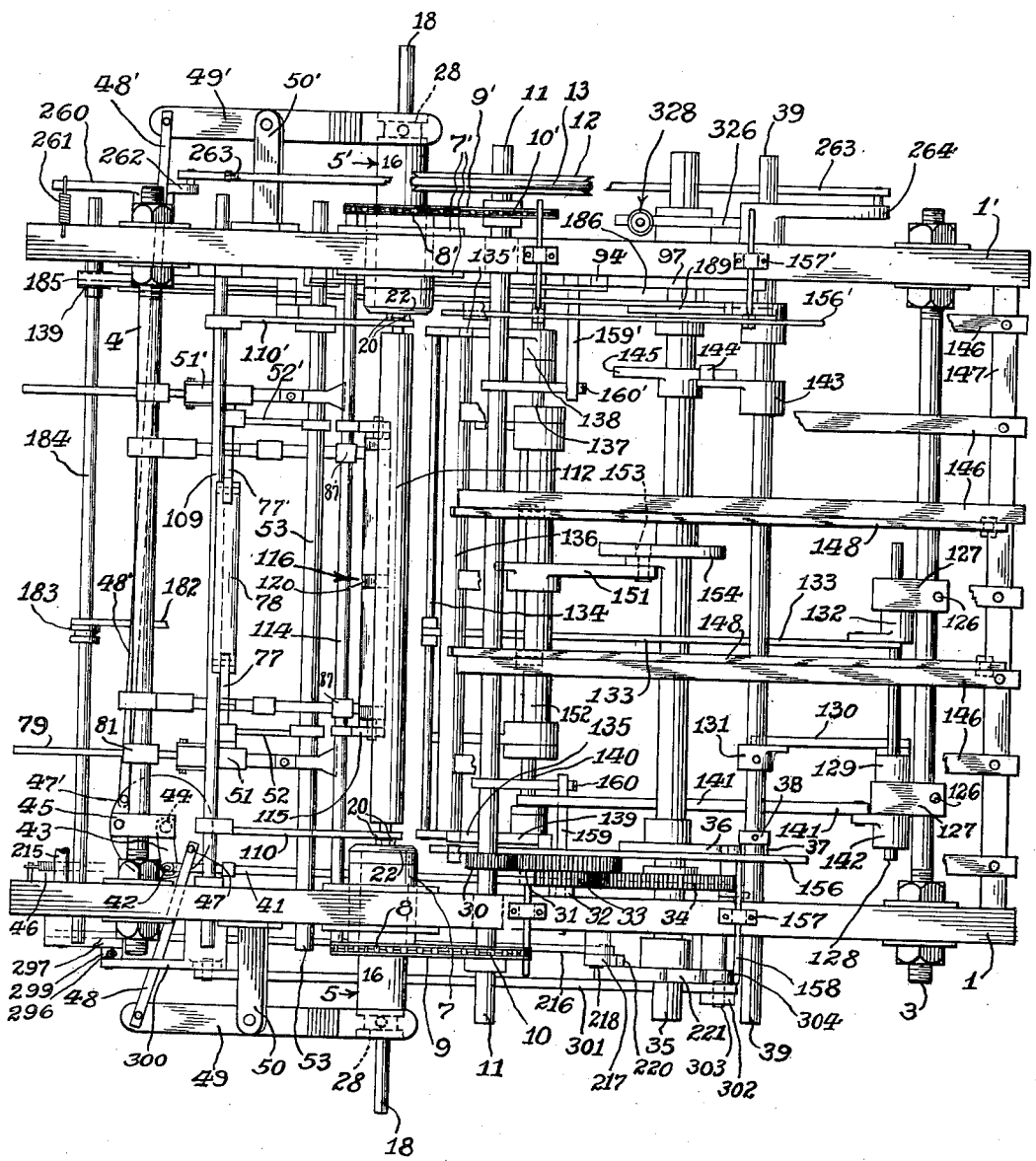

Jan. 2, 1940.    A. B. CARR ET AL    2,185,399
WINDING MACHINE
Filed May 19, 1938    11 Sheets-Sheet 3

INVENTORS
ALBERT B. CARR.
ROBERT H. FLUKER.
BY
Ward Crosby & Neal
their ATTORNEYS.

Jan. 2, 1940.　　　A. B. CARR ET AL　　　2,185,399
WINDING MACHINE
Filed May 19, 1938　　　11 Sheets-Sheet 4
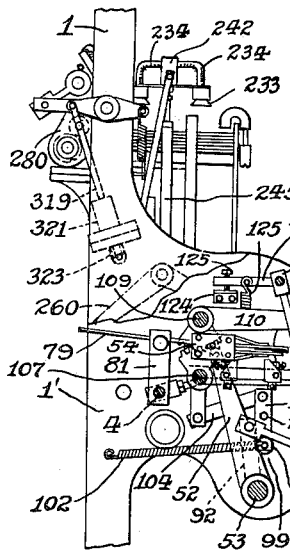
FIG.14.
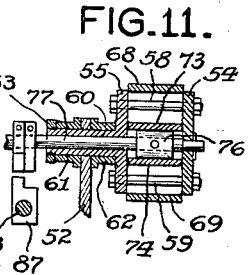
FIG.11.
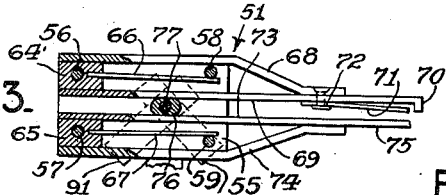
FIG.13.
FIG.17.
FIG.18.
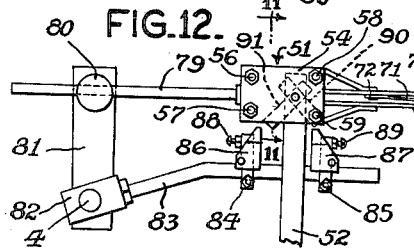
FIG.12.
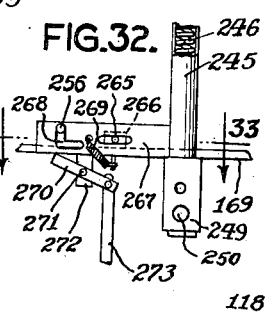
FIG.32.
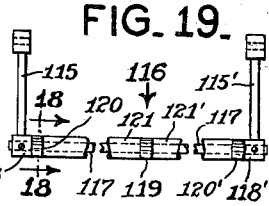
FIG.19.
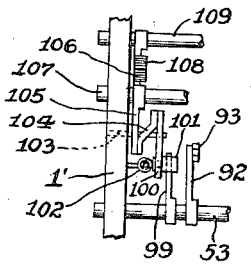
FIG.16.
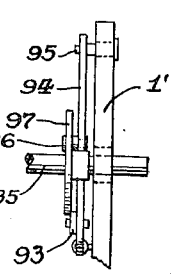
FIG.15.
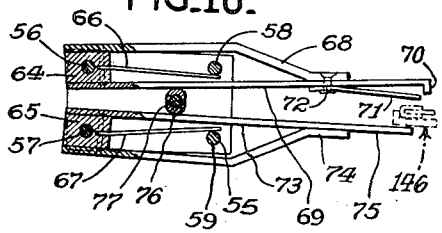
FIG.10.
INVENTORS
ALBERT B. CARR.
ROBERT H. FLUKER.
BY
Ward Crosby Neal
their ATTORNEYS.

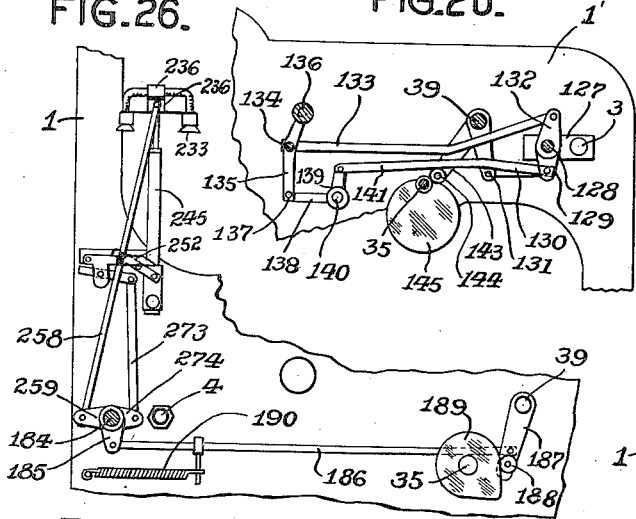

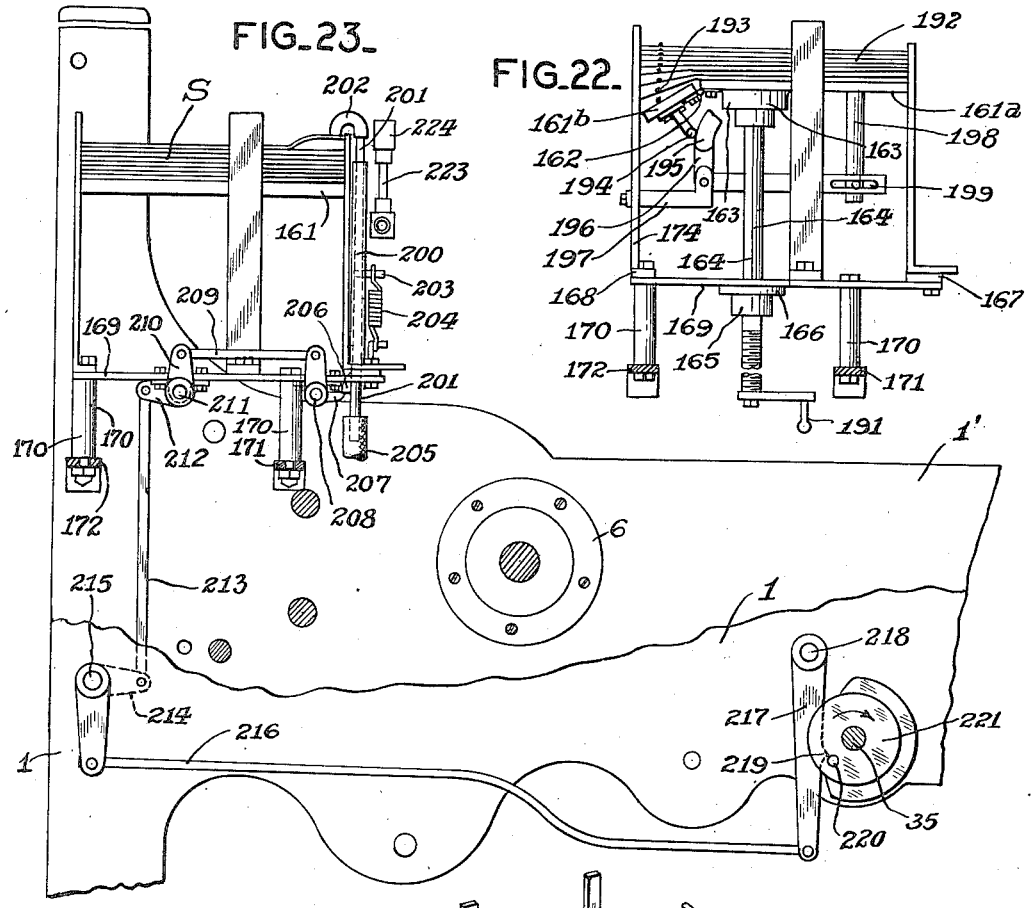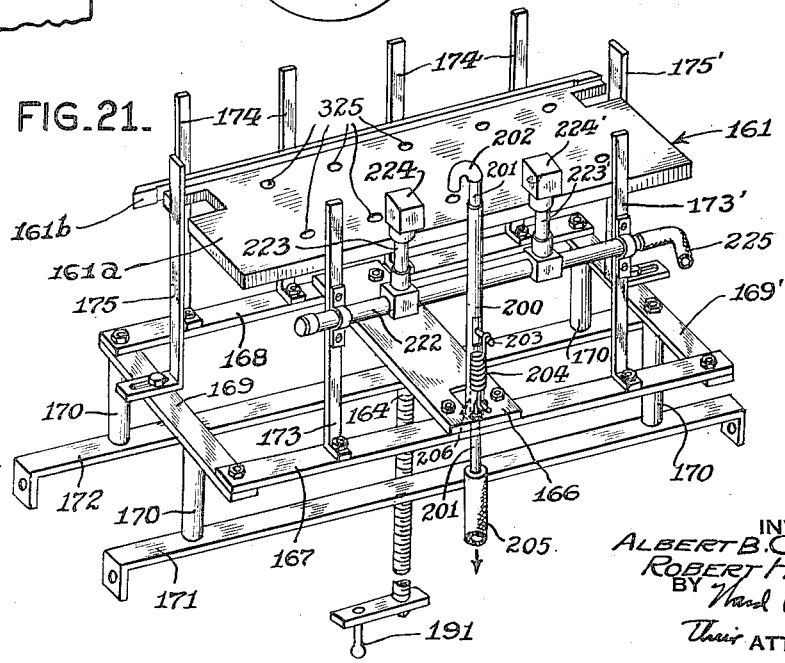

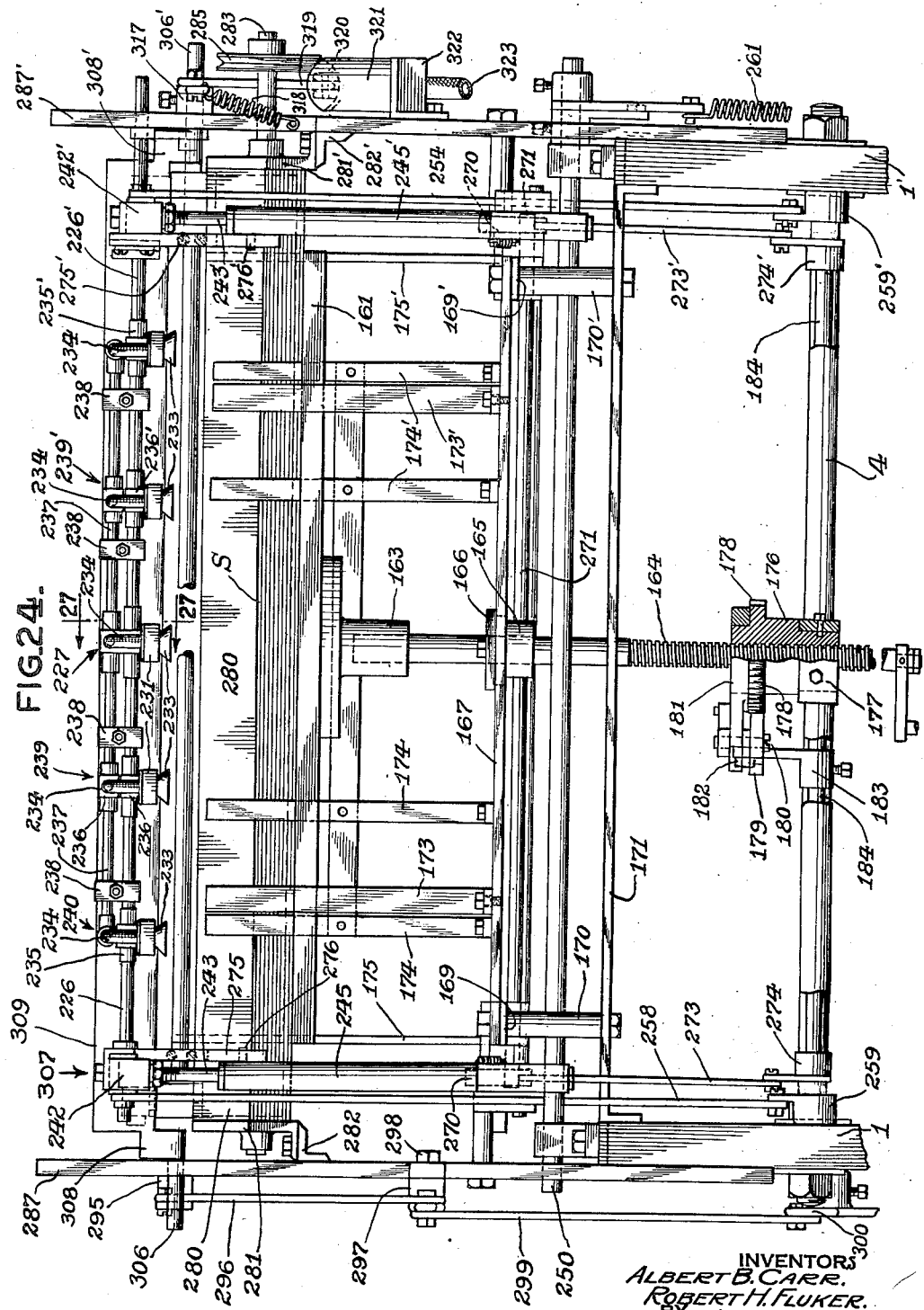

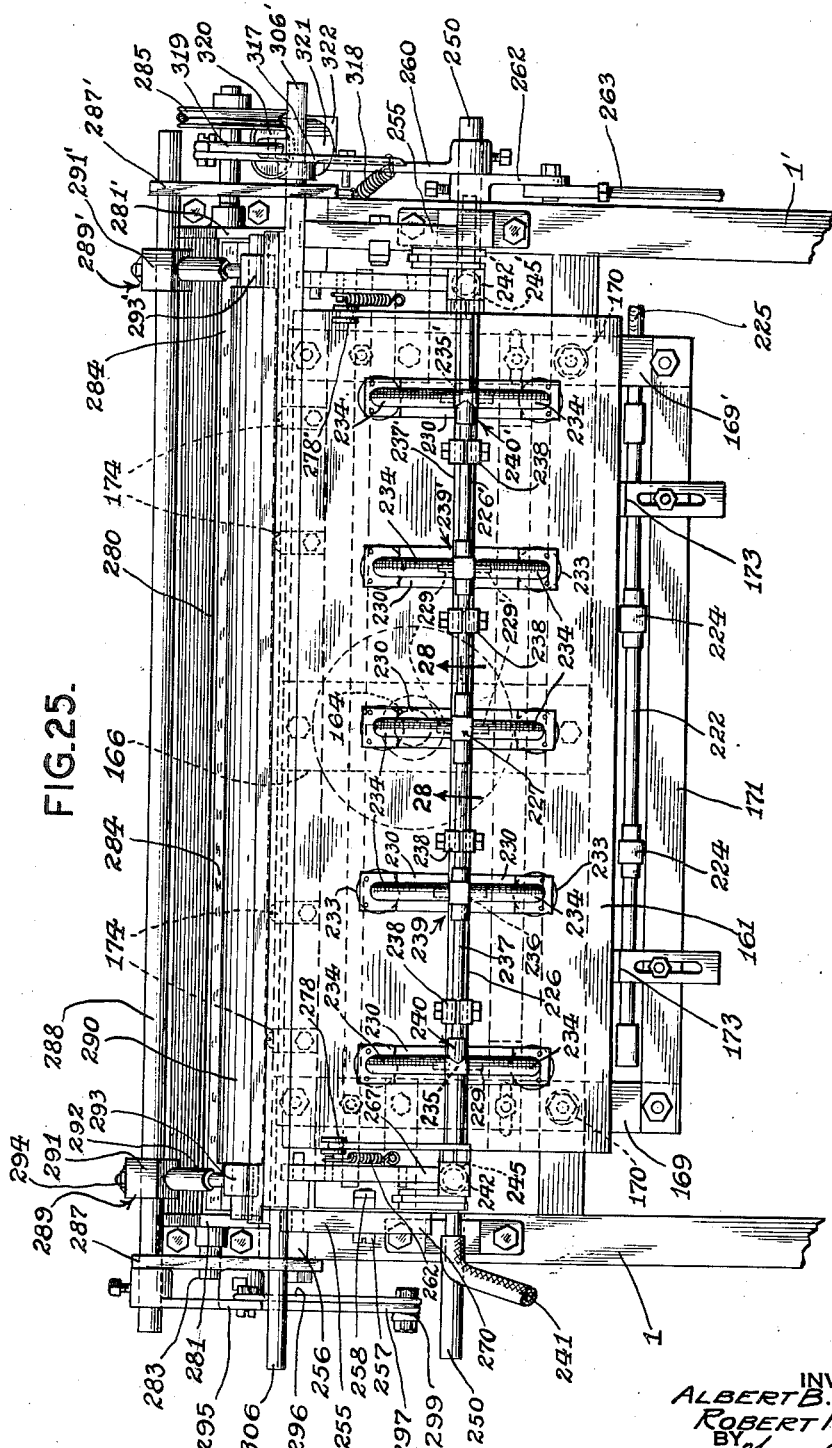

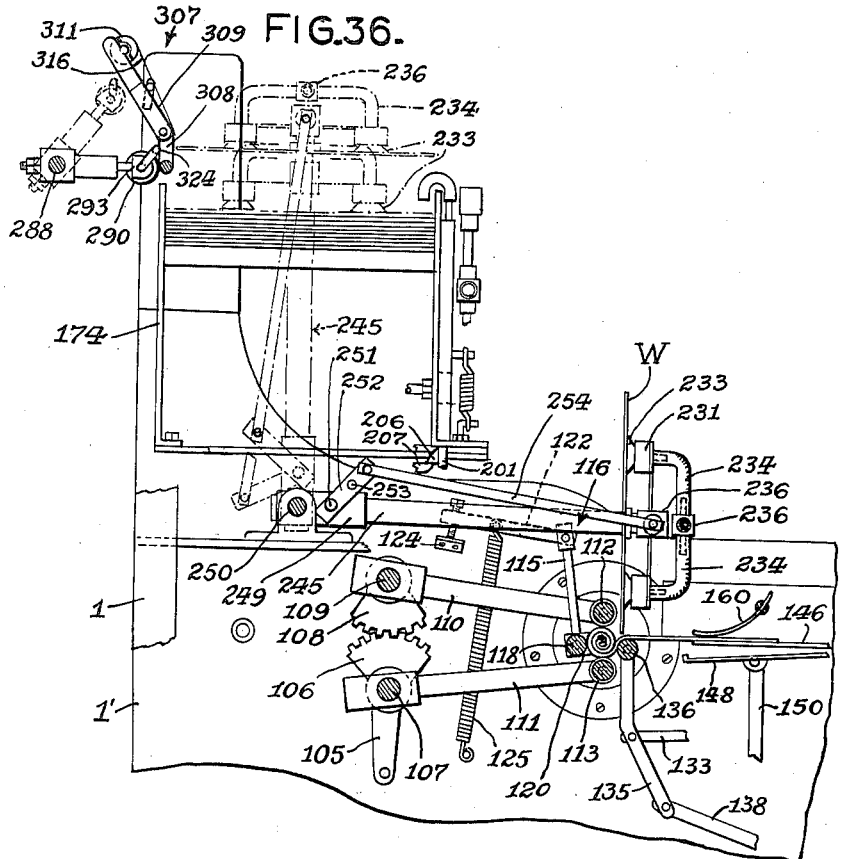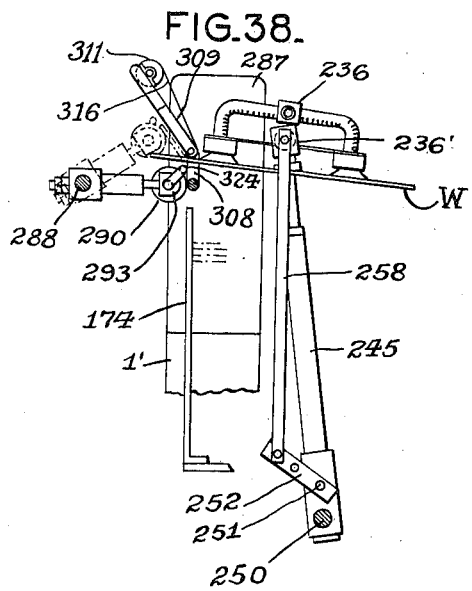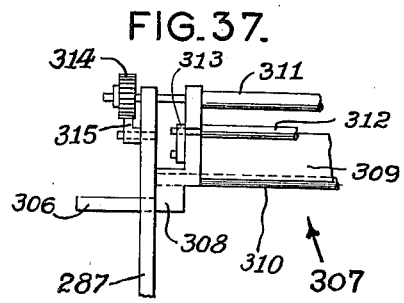

Jan. 2, 1940.  A. B. CARR ET AL  2,185,399
WINDING MACHINE
Filed May 19, 1938  11 Sheets-Sheet 10
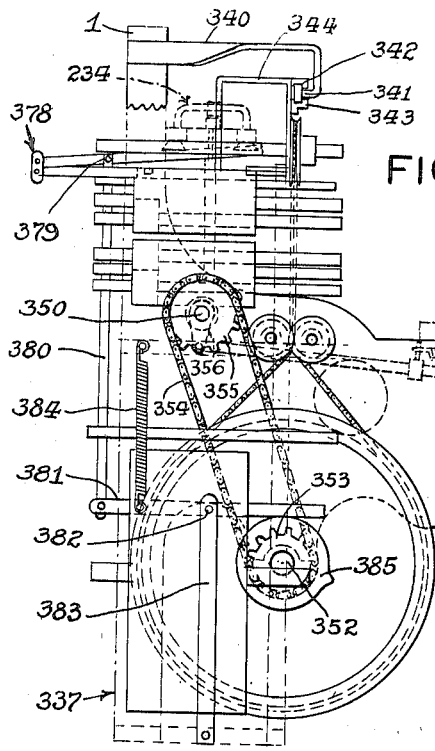
FIG.40.
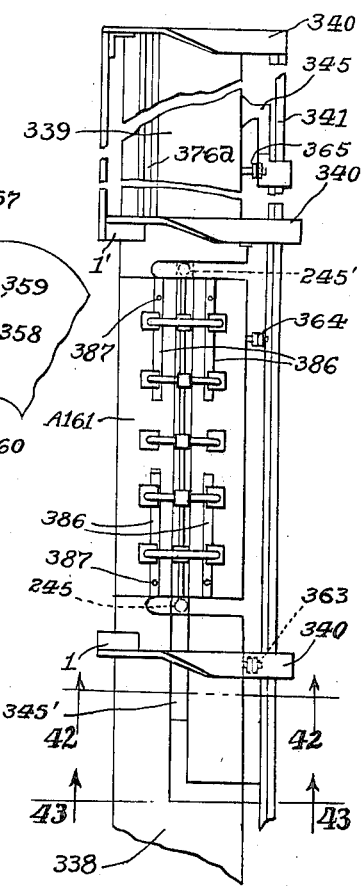
FIG.41.
FIG.43.
FIG.42.
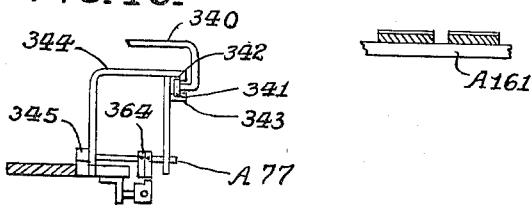
FIG.44.
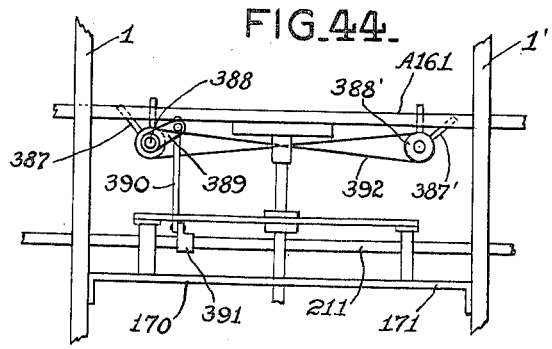
INVENTORS
ALBERT B. CARR.
ROBERT H. FLUKER.
BY
their ATTORNEYS.

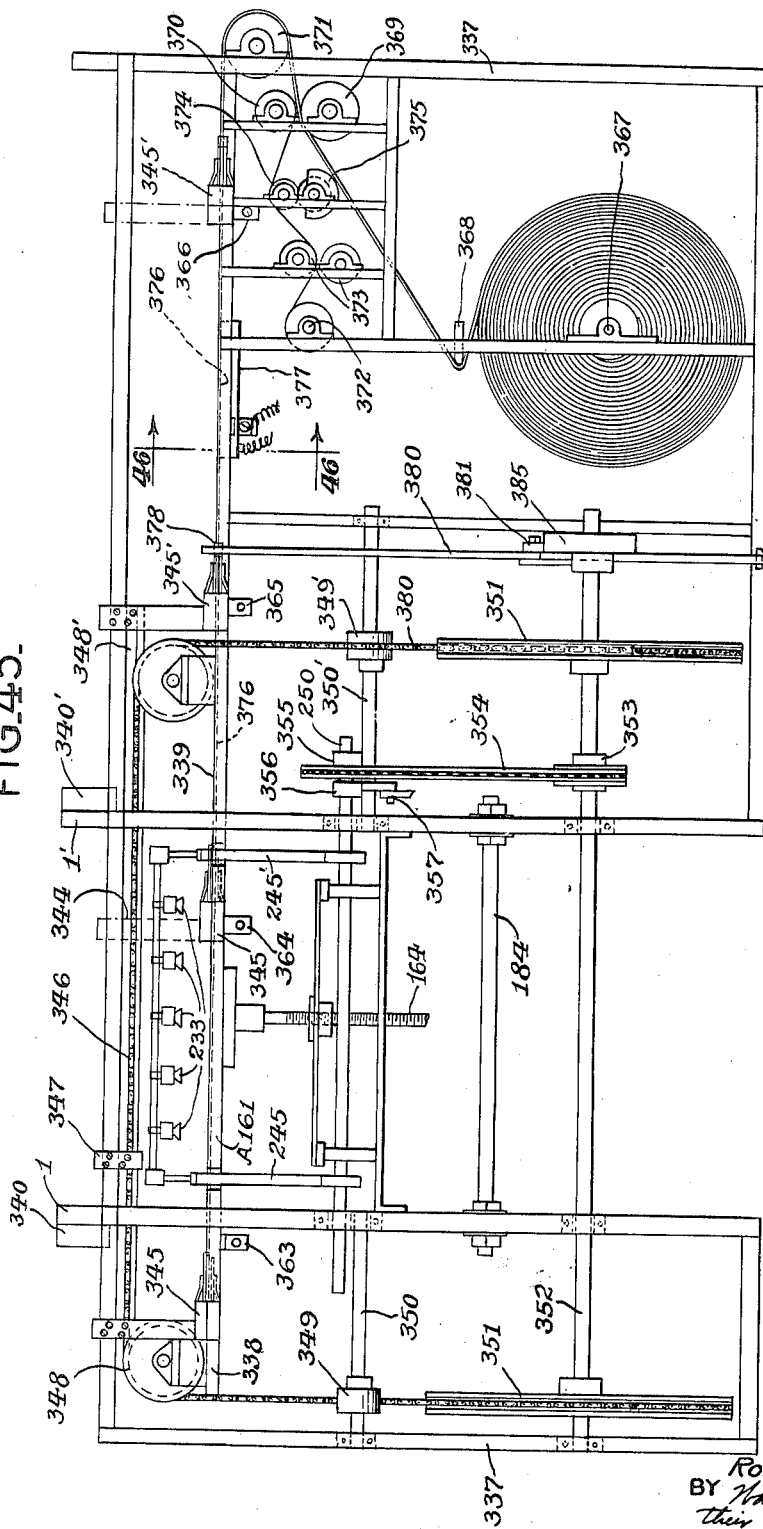
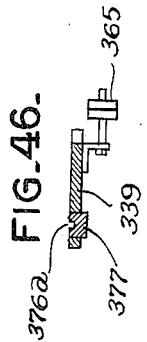

Patented Jan. 2, 1940

2,185,399

UNITED STATES PATENT OFFICE 2,185,399

WINDING MACHINE

Albert B. Carr and Robert H. Fluker, Atlanta, Ga.;
said Fluker assignor to said Carr Application May 19, 1938, Serial No. 208,811

24 Claims. (Cl. 270—27)

This invention relates to winding and wrapping machines for flexible sheets; and more particularly to a machine for winding and wrapping calendars, maps and pamphlets and the like, and automatically producing wrappers as needed.

An object of the invention is to provide an efficient and durable machine capable of automatically rapidly winding calendars or the like into compact substantially uniform cylindrical shape; making, wrapping and sealing the wrapper around the wound calendar, thus facilitating handling, packing or mailing of the calendar.

The invention consists in the novel features, arrangements and combination of parts embodied by way of example in the apparatus hereinafter described as illustrating the preferred form of the invention, and the invention will be more particularly pointed out in the appended claims.

Further objects and advantages of the invention will more fully appear from the following description taken in connection with the accompanying drawings which show, by way of example, the present preferred embodiment of the invention.

Referring to the accompanying drawings, in which the same reference characters indicate the same parts in the various views:

Sheet 1

Fig. 1 is a left-hand side elevation of the winding and wrapping portion of the machine;

Fig. 2 is a plan view of the winding chuck, somewhat enlarged;

Fig. 3 is an end elevation of the jaw end of said winding chuck, somewhat enlarged;

Fig. 4 is a longitudinal sectional view of said winding chuck taken along its axis, somewhat enlarged;

Fig. 5 is a cross-sectional view of the winding chuck taken transverse its axis, somewhat enlarged;

Fig. 5A is a side elevation, partly in section, of the winding chuck mounting showing adjustability, somewhat enlarged;

Sheet 2

Fig. 6 is a plan view of the winding and wrapping portion of the machine;

Sheet 3

Figure 8:
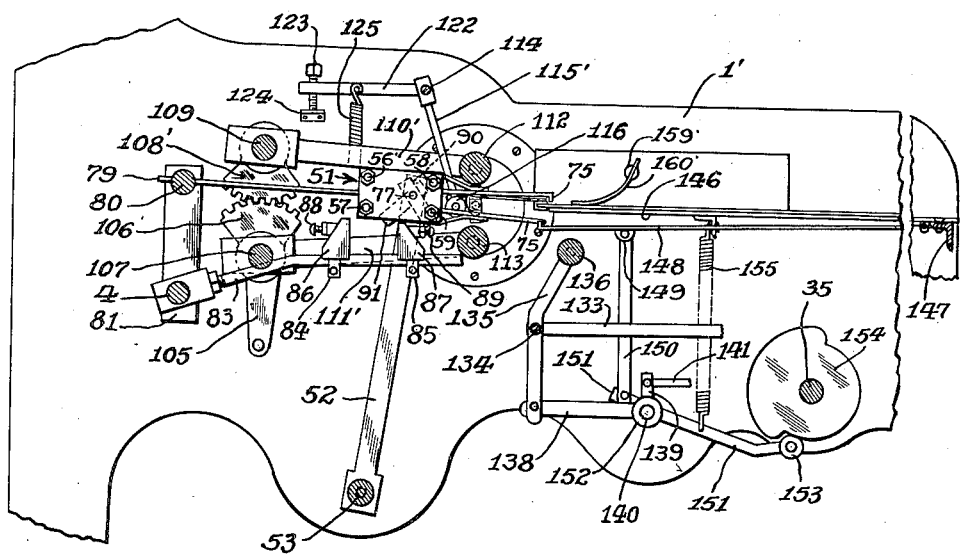
Figure 9:
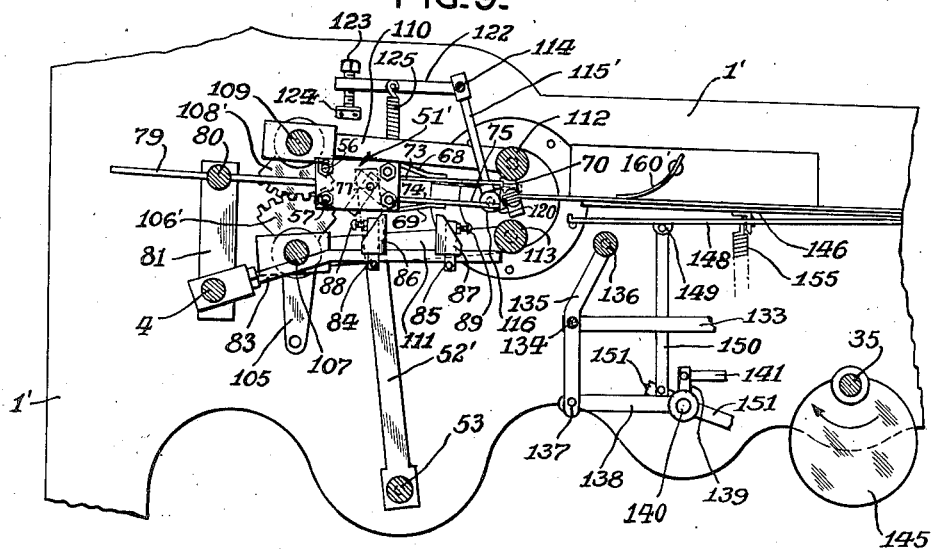
Figure 7:
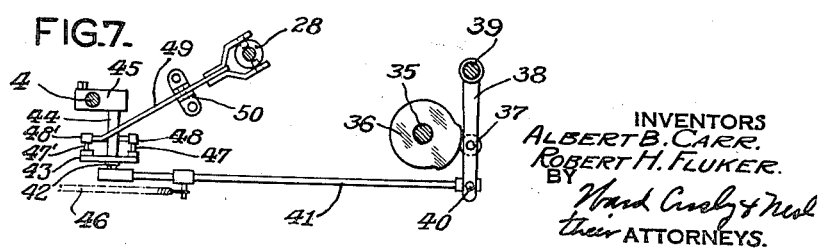

Fig. 7 is a side elevation of the mechanism for operating the chuck jaws;

Fig. 8 is a side elevation, somewhat enlarged and partly in section, showing relative positions of certain parts when the feed grippers are positioned to engage the calendar to feed it to the winding chucks;

Fig. 9 is a similar view showing relative positions of said parts after the grippers have fed the calendar to the chuck jaws;

Sheet 4

Fig. 10 is a side elevation of a gripper jaw showing releasing means therefor;

Fig. 11 is a sectional view taken on line 11—11 of Fig. 12, somewhat enlarged;

Fig. 12 is a side elevation of the gripper and operating mechanism;

Fig. 13 is a side elevation of a gripper, somewhat enlarged, and partly in section;

Fig. 14 is a side elevation of the machine partly in section and with a portion of the left-hand panel broken away to show the relative position of certain parts;

Fig. 15 is a front elevation showing cam and lever for operating the grippers;

Fig. 16 is a rear elevation of a portion of the mechanism for operating the grippers and pressure rollers;

Fig. 17 is a side elevation of the registering roller and supporting levers;

Fig. 18 is a sectional view taken at 18—18 of Fig. 19;

Fig. 19 is a front elevation of the registering roller and levers, showing bumper blocks;

Fig. 20 (Sheet 8) is a side elevation of the operating mechanism for the throat forming roller;

Sheet 5

Fig. 21 is a perspective view, somewhat enlarged, of the wrapper feeding mechanism frame;

Fig. 22 is a side elevation, somewhat enlarged, of mechanism for keeping the top of the wrapper stack level when pull cord wrappers are used;

Fig. 23 is a side elevation, somewhat enlarged, showing the mechanism for operating the wrapper suction lift;

Sheet 6

Fig. 24 is a front elevation of the wrapper feeding and gluing mechanism;

Sheet 7

Fig. 25 is a plan view of the mechanism shown in Fig. 24;

Sheet 8

Fig. 26 is a side elevation of operating mechanism and wrapper feeding arms;

Fig. 27 is a sectional view taken at 27—27 of Fig. 24;

Fig. 28 is a sectional view of pipe connection manifold taken at 28—28 of Fig. 25;

Fig. 29 is a front elevation of suction head wrapper lifting mechanism;

Fig. 30 is a diagrammatic sketch showing air pump and air line connections;

Fig. 31 is a sectional view of a portion of the wrapper feeding arms, showing details of construction;

Fig. 32 (Sheet 4) is a view showing details of latch and tripping mechanism parts for the wrapper feeding arms;

Fig. 33 (Sheet 8) is a sectional plan view, considerably enlarged, of certain details of Figs. 31 and 32;

Fig. 34 (Sheet 8) is a side elevation of Fig. 29 showing arrangement of parts to tilt the suction head;

Fig. 35 (Sheet 1) is a right-hand side elevation of the machine with wrapper making portion removed;

SHEET 9

Fig. 36 is a side elevation of portion of wrapper feeding and gluing mechanism (somewhat enlarged);

Fig. 37 is an end elevation of part of the wrapper gluing mechanism (somewhat enlarged);

Fig. 38 is a side elevation of a portion of the wrapper feeding and gluing mechanism showing the suction head in tilted position with a wrapper position to have glue applied to the edge thereof;

Fig 39 (Sheet 1) is a section through suction line relief valve;

SHEET 10

Fig. 40 is a side elevation of the machine showing wrapper making mechanism;

Fig. 41 is a plan view of a portion of said wrapper making mechanism;

Fig. 42 is a cross-sectional view taken at 42—42 of Fig. 41;

Fig. 43 is a similar view taken at 43—43 of Fig. 41;

Fig. 44 is a front elevation showing wrapper positioning mechanism;

SHEET 11

Fig. 45 is a front elevation of the machine showing wrapper making mechanism, with certain parts illustrated in Fig. 44 omitted for the sake of clarity, and Fig. 46 is a cross-sectional view taken at 46—46 of Fig. 45.

Before taking up a detailed description of the machine, a general description will be given setting forth some of the most important features in a general way. Directly opposite and supported in suitable side frame panels are the continuously rotating winding chucks driven by sprockets and chain from a drive shaft connected to a source of power controlled by a clutch or electric line switch. By suitable means the chuck jaws are made to move back and forth axially in the chuck housing and to open and close, thus engaging and releasing the calendar, or other article being operated upon, before and after it is wound and wrapped, respectively. Suitable means to be described hereafter is provided to properly position the calendar for proper engagement by chuck jaws. By suitable means the first convolution of the calendar is controlled, and continuous uniform pressure exerted on the entire width of the calendar thereafter until ejected. Means is provided to prevent wrinkling and tuckering of the sheets in the convolutions. Means is provided for successively feeding wrappers and putting a film of adhesive on a portion of each wrapper to make a proper seal. Means is provided to make wrappers from a roll of paper and attach a pull string to the paper from which the wrappers are made. Means is provided to cause each part of the machine to coact and function in proper relation to other parts.

In the preferred embodiment of the invention the machine may be utilized for winding and wrapping pamphlets or the like in cases where ready-made wrappers are placed in position on the machine ready for use, as well as where the wrappers are made by the machine as needed from a roll of suitable sheet material. In order to simplify an understanding of the invention, those features of the machine will be first described relative to the use where ready-made wrappers are to be employed, and in conjunction with such disclosure the remaining portions of the machine having to do with the making of the wrappers will be omitted from the drawings. Thereafter, the complete machine will be indicated by drawings in which the wrapper making mechanism will be illustrated in detail and the remaining portions of the machine previously described will be illustrated only to the extent of such parts as are necessary to a complete understanding.

*Winding chucks*

Referring to the drawings, and more particularly to Figs. 1-6, inclusive: 1 and 1' indicate respectively left and right side panels of machine provided with and supported on legs 2—2' and said panels are held in laterally spaced position by front and rear tie rods 3 and 4 and cooperating rod nuts. Winding chucks designated in their entirety as 5 and 5' are each journaled (Fig. 5A) in bearings such as 6 suitably secured in respective panels 1—1'; and the chucks are held in axial position (Figs. 6 and 1) by respective collars 7—7', secured to the chucks inside the panels, and the hubs of the sprockets 8—8' secured to the chucks outside the panels. Sprockets 8—8' (Figs. 1 and 6) are driven respectively through chains 9—9', which are geared to and driven by sprockets 10—10', rigidly secured to and rotatable with power shaft 11 which is supported in suitable bearings fastened to panels 1—1'. On the right hand outer end of shaft 11 is securely fixed a pulley 12 driven through belt 13 from a suitable source of power such as electrical motor 14 mounted on a shelf 15 on the outside of panel 1'. The motor 14 is controlled by a switch placed on machine frame at any convenient position. If other source of power is used to drive the machine, a clutch and lever is used as a control means.

The winding chucks 5—5' each comprise (Figs. 2-5, inclusive) a hollow cylinder 16 with inner and outer surfaces machined and having a guide bearing 17 fitted therein flush with one end and pinned thereto. The bearing 17 is provided with an axial guide bore coincident with the axis of the cylinder 16 and into which is slidably fitted push rod 18 to one end of which is rigidly secured a block 19. A pair of jaws 20 are pivotally attached to 19 at one end and the other ends extend through a slot in face plate 21, which is fixed to the outer end of cylinder 16 as by being screwed to a collar 22 welded to the cylinder.

The outer ends of jaws 20 are urged apart by a helical compression spring 23 positioned therebetween and seated in cooperating recesses in said jaws. In the jaw end of the cylinder 16 are fitted two plates 24 which are spaced apart parallel to each other by blocks such as 25 and held in place as by pins 26. These plates and spacers extend into the cylinder forming a rectangular passage in which said block 19 is adapted to move. Between the plates 24 and on each side of the jaws 20 are rollers such as 27 whose axes are journaled in said plates and against which said jaws 20 are spring pressed by spring 23. Push rod 18 carries fixed on its outer end, as by a set screw, a grooved collar 28 so positioned that when push rod 18 is moved to the right the jaws 20 are similarly moved, causing them to close due to the tapered portion of the jaws coming between the rollers 27; and conversely, when the push rod 18 is moved to the left, the jaws are drawn into the chuck casing and are forced apart or opened due to action of coiled spring 23. A limit pin 29 is placed in the rod 18 to limit movement of the rod to left. The mechanism for operating these chucks to effect the winding will now be described.

*Winding means*

Keyed on driven shaft 11, on the inside of panel 1 (Fig. 6), is spur pinion 30 which meshes with an intermediate gear 31 rotatably fitted on stud shaft 32 bolted to side panel 1. Fastened to hub of 31 and made to rotate with it is intermediate gear 33 which meshes with and drives gear 34 keyed to timing cam shaft 35 which is journaled in bearings supported in side panels 1 of the machine. The said gears 30, 31, 33 and 34 are such that shaft 11 makes preferably twenty revolutions while shaft 35 makes one revolution, and since the chuck sprockets 8—8' and the drive sprockets 10—10' on power shaft 11 have the same diameter the speed ratio of chucks 5—5' and timing shaft 35 is a constant; and if the chuck jaws are open at the beginning of a revolution of cam shaft 35 they will be in the same position at the beginning of every revolution of shaft 35. The importance of this feature will be more apparent when the operation of the machine is described later herein.

Keyed to cam shaft 35 (Fig. 6) adjacent gear 34 is a cam 36 for actuating the jaws of winding chucks 5—5' in an axial direction (see also Fig. 7, Sheet 3). Cam 36 is in contact with a cooperating cam roller 37 carried on arm 38 pivotally supported at its upper end on a cross shaft 39 supported on side frames or panels 1—1'. Arm 38 is held in axial position by set collars (not shown), and its lower end is pivoted at 40 to the forward end of a crank link 41, whose rear end is pivotally connected to a crank pin 42 screwed into the under side of a crank disc 43, which is rotatably journaled on the lower end of a vertical spindle 44 dependent from a supporting bracket 45 rigidly clamped to the tie rod 4. A tension coil spring 46 attached at its rear end to panel 1 and at its front end to crank link 41 holds cam roller 37 on cam 36. Crank disc 43 carries screwed into the upper face thereof crank pins 47—47' to which are pivotally connected the inner ends of the respective crank links 48—48' (see Fig. 6) which pass outwardly through holes in side frames 1—1' and whose outer ends are pivotally connected respectively to the rear ends of chuck jaw actuating arms 49—49' pivotally supported at their median portions on brackets 50—50' attached to the respective side frames 1—1' and having their forward bifurcated ends in operative engagement with the grooved collars 28—28' of the respective winding jaws 5—5'.

It is obvious that as cam 36 revolves, the chuck jaws are made to open and close, also to move back and forth through slot in face plate of chuck.

*Feeding grippers*

Referring to Figs. 6, 8 and 9: a pair of feeding grippers designated in their entirety as 51—51', respectively, are supported on the upper ends of respective arms 52—52', whose lower ends are adjustably fixed to a cross shaft 53, journaled in side frames 1—1', for oscillation thereby. The details of construction and arrangement of the grippers will first be described, and thereafter their means of operation from the cam shaft 35 will be better understood. The grippers being identical, only the left hand gripper will be described.

With reference to Figs. 10-14, inclusive (Sheet 4): gripper 51 comprises a housing having a pair of side plates 54, 55 spaced apart by pins 56, 57, 58 and 59 provided with end portions of reduced diameter passing through the plates and in threaded engagement with cooperative nuts holding the plates in assembled position. The plate 55 has integrally secured thereto a bearing sleeve 60 whose outer diameter is journaled in the upper end of arm 52 for relative rotative movement with respect thereto but fixed axially thereon by means of spacing bushings 61—62 held in adjusted position by nut 63. Journaled on the rear pins 56—57 are a pair of jaw blocks 64—65 provided with cantilever leaf springs 66—67 whose rear ends are rigidly anchored respectively to said blocks and whose forward ends rest against the respective pins 58—59. Upper block 64 has rigidly secured thereto as by rivets jaw elements 68 and 69 providing an upper jaw 70 having a hook end. On the inner face of jaw 70 a leaf spring 71 is attached at its rear end as by a rivet 72, and its front end stopping short of and normally positioned flush with or slightly beyond the inner face of the hook, so as to yield under pressure and recede behind the hook. Similarly, block 65 carries elements 73—74 forming a lower jaw 75 whose straight outer end lies within the hook when the jaws are closed under the influence of springs 66—67. The jaws 70—75 are adapted to be opened by a cam 76 fixed to the cam shaft 77 (Fig. 11), one end of which is journaled in plate 54 and the other end of which extends through a journal provided in plate 55 and out through sleeve bearing 60 in which it has a free rotatable fit, and beyond which it projects toward the center of the machine (Fig. 6) where it is connected to one end of a universal coupling 78, whose other end is connected to the inner end of the corresponding cam shaft 77' operating the jaws of the right hand gripper 51'.

Attached rigidly to the rear of the housing of gripper 51 is a guide rod 79 (see also Figs. 12, 8 and 9) whose rear end is axially slidably mounted in a guide bearing 80 rotatably journaled for oscillation in a bracket 81 whose lower end is adjustably rigidly clamped to the rear tie rod 4.

Also rigidly clamped to tie rod 4 adjacent the inner side of bracket 81 is a bracket 82 into the forward end of which is rigidly secured a forwardly extending trip rod 83 carrying trip posts 84—85 rigidly clamped thereto in axially spaced relation. Pivotally supported on said posts are trip blocks 86—87 which are resiliently held outwardly toward their respective posts as by springs (not shown) so as to abut against adjusting screws 88—89. The upper ends of the trip blocks are provided with offset legs in respective operative alignment with respectively cooperating trip levers or arms 90—91 rigidly secured to the cam shaft 77 which, as previously stated, serve to open the feed gripper jaws 70—75. It will now be readily understood that as the gripper arms 52—52' oscillate back and forth, the grippers 51—51' are reciprocated forwardly and rearwardly in a wide arc, the guide rods 79—79' holding the grippers substantially parallel relative to each other and to the side frames 1—1' in their path of travel, with the trip arms 91—91' engaging the legs of trip blocks 87—87' toward the end of the forward stroke to open the jaws 70—75 and 70'—75'; and similarly arms 90—90' engaging the legs of trip blocks 86—86' toward the end of the rearward stroke to open the said jaws. Figs. 8 and 14 show the extreme foremost and rearmost positions of the grippers.

The gripper arms 52—52' are oscillated by the rotary oscillation of their supporting shaft 53 (Figs. 6 and 14) as follows. Shaft 53 has rigidly secured thereto adjacent side frame 1' an upwardly extending crank arm 92 (see also Fig. 16), whose upper end is pivotally attached to the rear end of a link 93 pivotally attached at its forward end to a cam roller arm 94, whose upper end is pivotally supported at 95 (see also Fig. 15) to frame 1'. Arm 94 has attached intermediate its ends a cam roller 96 in cooperative engagement with a cam 97 securely fixed to cam shaft 35; the cam roller 96 is urged against the cam 97 by a helical tension spring 98 whose rear end is attached to the lower extremity of the arm 94 and whose front end is attached to frame 1'. This spring, therefore, also acts to resiliently actuate the forward movement of the connected link train, gripper arms 52—52' and grippers 51—51', thereby providing a yielding drive should the gripper jaws be obstructed during their forward movement, as by an article being operated upon.

Pressure roller means

Referring to Figs. 16 and 14: shaft 53 carries fixed thereto next to side frame 1' a cam plate 99 which moves back and forth with 53 as it is oscillated as described above. Cam lever 100 carries cam roller 101 which is held against face of cam 99 by tensioned coiled spring 102, one end of which is fastened to the cam roller spindle and the other end fastened to machine frame 1'. Cam lever 100 is pivotally supported by stud 103 which is screwed into machine frame 1' and projects inwardly therefrom. The upper end of cam lever 100 is fastened pivotally to one end of link 104, the other end of which is fastened pivotally to crank arm 105 which extends downwardly from hub of segmental gear 106 (Figs. 8 and 9). Segmental gear 106 is fastened to shaft 107 as by a set screw and meshes with another segmental gear 108 positioned above and set screwed to shaft 109, which is journaled in suitable bearings located in the side frames 1—1'. Set screwed to shaft 109 adjacent the respective frames 1—1' are arms 110—110' which extend to the right transversely of axis of shaft 109. A pair of like arms 111—111' are similarly fastened to shaft 107 and positioned directly beneath arms 110—110'. These arms are provided with bearings adjacent their ends to which journals on the rollers 112 and 113 are rotatably fitted. These bearings are adjacent the ends of the rollers and prevent the rollers from moving axially. It is obvious that as shaft 53 oscillates back and forth, the rollers 112 and 113 move toward and away from each other respectively; the movement of cam plate 99 forward, moving these rollers apart and the tensioned coiled spring 102 urging them together.

Bumper roller

A shaft 114 (see Figs. 6, 8 and 9) is rotatably fitted to bearings in side panels of frames 1—1' of the machine. Bumper roller arms 115—115' are positioned and fastened to shaft 114 at spaced points just inside the respective grippers 51—51', and supported on the forward end of said arms is a bumper roller device, designated in its entirety as 116, positioned between and adjacent grippers 51—51' so that when the gripper jaws move forward they do not strike said arms of roller device 116 but pass by adjacent ends of said roller and as they return with a calendar the calendar strikes the roller device 116. The roller device (Figs. 17, 18 and 19; Sheet 4) comprises a rod 117 rigidly fastened in bearings 118—118' at the ends of arms 115—115' by any suitable means, such as set screws, and carries at its mid point a bumper 119 rigidly pinned thereto. Adjacent each rod bearing and integral therewith are provided bumpers 120—120' (see Fig. 19). These three bumpers have slightly concave faces serving to assist the formation of the roll on the article being operated upon. Between the bumper 119 and 120 and 120' and freely rotatably mounted thereon respectively are roller sections 121—121'. Near one end of shaft 114 and adjacent the side panel 1' is positioned crank arm 122 (Figs. 8, 9 and 14), the hub of which is pinned to shaft 114 and which projects rearwardly in a direction parallel to plane of side panel of machine and is provided at its rear end with adjusting stop screw 123 which is spring pressed against limit stop 124 fastened to frame 1' by any suitable means, such as cap screws. The helical tension spring 125 has one end fastened to arm 122 by means of a projecting lug and the other end fastened to stud projecting from side panel 1'.

Compensating roller

Clamped on tie rod 3 (see Figs. 6 and 14) by clamping screws 126—126' are brackets 127—127' which provide bearings in which is rotatably supported a shaft 128. The hub of a crank arm 129 is pinned to 128, the lower end of which is pivotally attached to one end of a link 130 whose opposite end is pivotally attached to the lower end of a crank arm 131 whose hub is pinned to shaft 39 and receives motion therefrom by means to be hereinafter described. A crank 132 (Fig. 6) is pinned to shaft 128 adjacent bracket 127', and link 133 pivotally connects said crank to a transverse tie rod 134 connecting arms 135 and 135' (see also Figs. 9 and 20) which are provided at their upper ends with journals for receiving and rotatably supporting a compensating roller 136. The lower ends of arms 135—135' are provided with bearings by which they are rotatably supported on a shaft 137 (Figs. 20, 8 and 9) and are held in position by means of set collars (not shown). Shaft 137 is journaled at its right end (Fig. 6) in crank arm 138 and at its left end in the forwardly extending arm of a bell crank 139; said cranks being rigidly pinned to and supported by a shaft 140 suitably journaled in side frames 1—1'. The other arm of the bell crank 139 extends upwardly and is pivotally connected with one end of a link 141, the other end of which is connected pivotally to a crank arm 142 whose hub is rigidly pinned to the shaft 128 (see Figs. 6 and 20).

Shaft 39 carries fixed thereto, adjacent frame 1', a crank arm 143 provided with a cam roller 144 in operative driven engagement with a driving cam 145 secured on cam shaft 35; so that as shaft 35 rotates, cam 145 causes an oscillation of shaft 39, crank arm 131, link 130 and crank arm 129. It is obvious that as crank 129 is moved back and forth a rocking motion is transmitted to shaft 128 and connected arms 132 and 142, and that as 132 is moved forward 142 is moved to the rear, and that the movement of 132 causes arms 135 and 135' to move to the right, moving roller 136 to the right; and that as crank arm 142 is moved rearwardly 141 moves readwardly, causing arm 139 to raise shaft 137 on which arms 135 and 135' are supported; and by this means roller 136 is raised and as a result of the combined motions imparted to said roller it is moved to a position in which it is parallel to and adjacent to a line running axially through centers of winding chucks 5—5'.

Feed table and calendar stop

At the input or forward end of the machine a feed table or runway is made (see Figs. 6 and 8) of flat strips 146 spaced apart and riveted to spaced apart angle irons such as 147, the ends of which are fastened to side panels of machine by suitable means such as machine screws. Positioned between a pair of strips 146 and lying parallel therewith midway to table between side frames 1—1' is a pair of flat springs 148, one end of which is fastened to forward angle iron 147, the other end being bent upwardly at right angles to plane of runway surface and extending a short distance above the surface of the runway. Fastened to the under side of said spring with rivets and adjacent its bent end is bracket 149 (Fig. 8) provided with a bearing to which the upper end of a link 150 is pivotally attached, and whose lower end is similarly attached to the rear end of double end crank arm 151 which is rigidly keyed to a hollow shaft 152, and whose front end carries a cam roller 153 which is spring pressed against a cam 154, the hub of which is set screwed to cam shaft 35. Said hollow shaft 152 is rotatably journaled on shaft 140 and is held in position by set collars adjacent its ends. A helical tension spring 155 has one end fastened to crank arm 151 and the other end fastened to one of the angle irons 147. A notched-out place (not shown) in angle iron 147 directly beneath spring 148 allows said spring to be moved downwardly.

Referring more particularly to Figs. 6 and 14: the following provision is made for holding the articles to be operated upon properly centered on and against the feed table during the time that they are being fed to the winding chucks 5—5' by the grippers 51—51'. Side rails 156, 156' are supported adjacent and parallel to the respective side frames 1—1' with their lower edges contiguous the plane of the feeding table; these rails being in the form of plates which are rigidly secured to the vertically extending legs of brackets such as 157 (Fig. 14), each of which is provided with an outwardly extending bearing portion engaged in a split clamp bearing such as 158 secured to the upper edge of the side frames 1—1' in such manner as to permit the brackets 157 and the guide plates 156—156' to be adjusted transversely of the machine to provide for different width of articles being operated upon and serving to provide a parallel guideway for said articles. The guide plates 156—156' carry rigidly secured thereto and projecting inwardly therefrom respective anchor rods 159—159', to the inner ends of which are anchored the respective flat springs 160—160' which are positioned over the feed table and are bent downwardly and forwardly as clearly shown in Fig. 14 to resiliently press the articles being operated upon flatly against the feed table and also exert a substantially uniform pressure on said article during the time that it is being fed forward.

Wrapper table

The wrappers to be used for wrapping calendars are placed in a pile or stack on table 161 (see Figs. 21 and 22; Sheet 5). It is essential that at all times the top wrapper of the stack be in a plane substantially parallel to the top surface of table 161. Pull string wrappers have a string attached to them and when placed on a stack, the stack is thicker at the place where the strings are. To keep the top of the stack level, i. e., parallel, with the surface of the table, the table is made in two sections designated as 161a and 161b which are connected by hinges such as 162. Section 161a carries bolted thereto a bearing block 163 into which is rotatably journaled the upper unthreaded end of a lifting screw 164 which extends downwardly through a guide block 165 bolted to a frame piece 166 rigidly attached to a frame comprising front and rear pieces 167—168 and side pieces 169—169'; said frame being supported on pedestals such as 170 resting on cross members 171—172 which extend transversely between and are supported from side panels 1—1' (see also Figs. 23 and 24). Secured rigidly to front frame piece 167 and extending vertically upwardly therefrom (Fig. 21) are a series of guides such as 173; and similarly supported on rear frame piece 168 are a series of like guides 174. Laterally adjustable vertical guides 175—175' are carried on side frame pieces 169—169'. Said guides serve to guide said table 161 and the pile of wrappers carried thereon; said end guides 175—175' being adjustable for wrappers of different widths and adjacent notches being provided in table section 161a to accommodate their movement.

Table actuating means

The lower threaded end of the lifting screw 164 (Fig. 22) passes downwardly beyond tie rod 4 (Figs. 22 and 24) and is screwed through the hub of an actuating screw block 176 (Fig. 24) which is journaled in a bearing bracket 177 supported on and rigidly clamped to tie rod 4 intermediate side frames 1—1'. The screw block 176 on its lower journaled end is provided with a circumferential groove into which is positioned a lock screw passing through bracket 177 to axially hold said block while permitting rotation thereof, and has integrally formed thereon a ratchet wheel 178 adapted to be intermittently driven by an oscillating pawl 179 pivotally supported as by a screw 180 secured to a pawl ring 181 rotatably journaled on an upper hub of screw block 176. Said pawl ring is suitably pivotally connected by a rearwardly extending link 182 (Fig. 6) to a crank arm 183 rigidly secured to a cross shaft 184 which is suitably journaled in the side frames 1—1'. Shaft 184 has secured thereto, adjacent side frame 1' (Figs. 26, Sheet 8, and 6, Sheet 2) an arm 185 which is pivotally connected by a rod 186 to a cam roller arm 187 pivotally journaled on shaft 39 and carrying pivotally secured to its lower end a cam roller 188 in driven engagement with a cam 189 rigidly secured to the cam shaft 35. A helical tension spring 190 is secured to rod 186 at one end, and anchored to frame 1' at its other end, and serves to urge the rod and its connected parts in the opposite direction to that effected by the cam 189. It will therefore be seen that as the cam shaft 35 rotates the ratchet and integrally attached screw block will be advanced one tooth at each rotation of cam shaft 35, and accordingly the screw 164 (Fig. 24) and table 161 will be raised; the parts being so proportioned that the table will be raised an amount equal to the thickness of one wrapper (in the present embodiment .0033"), thereby serving to keep the stack of wrappers on the table at substantially the same level as wrappers are fed from the stack which is indicated in the drawings as S. In order to conveniently and quickly lower the table 161 when additional wrappers are to be placed thereon, a crank handle 191 (Figs. 21 and 22; Sheet 5) is secured to the lower extremity of lifting screw 164.

What has been said thus far applies to wrappers without pull strings. We will now describe how wrappers with pull strings are handled.

Referring particularly to Fig. 22: 192 indicates a stack of pull string wrappers. The portion of the stack with pull strings is indicated by 193 and rests on the suspended hinged portion of table 161b, on the under side of which is securely fastened an arm carrying a cam roller 194 resting yieldingly on a cam 195 which is fastened to one arm of bell crank 196 whch is pivotally supported on the end of bracket 197 fastened to and supported by one of the guide rods 174. Fastened to the under side of table section 161a and extending downwardly is an arm 198 having at its end a pin fitted slidably in slot 199 located in the other arm of bell crank 196. It is obvious that as the table 161 is raised by screw 164, cam 195 will move to the left and cause table section 161b to gradually raise the sagging portion of wrappers and tend to keep the top wrapper of the stack level.

From the foregoing it will be obvious that the machine is adapted to utilize plain wrappers as well as wrappers having pull strings attached thereto, such pull strings serving the useful purpose of easily tearing the wrapper off the rolled article such as a calendar. At this point it might be mentioned that the feed table which has been previously described in connection with ready-made wrappers is adapted to be used in conjunction with correlated mechanism for making the wrappers from a roll of material and supplying them to the feed table. Such additional features will be more particularly described hereinafter, but for purposes of clarity the means of feeding the wrappers from the table to the articles being wrapped will first be described.

Wrapper feeding means

The wrapper feeding means comprises several cooperating mechanisms, and a brief introduction to these will be given first in order that the following detailed description may be more readily understood.

The forward edge of the uppermost wrapper is first separated from the stack by a suction finger engaging the forward edge intermediate the ends. Then air blasts are directed against the forward edge of the top wrapper respectively intermediate the suction finger and the wrapper ends. This serves to assure the removal of a single wrapper at a time when the uppermost wrapper is engaged by the suction lifting means which positions the wrapper to the rear of the table where suitable provision is made for applying the adhesive to the rear edge of the wrapper, and thereafter the wrapper is carried to and introduced in proper relation to the article being operated upon to be applied thereto.

Separating vacuum finger

Referring more particularly to Figs. 21 and 23 (Sheet 5): a tubular sleeve 200 is rigidly secured to frame piece 166 and extends vertically upwardly therefrom, and telescopically slidably positioned therein is a pipe 201 whose upper end carries secured thereto an elbow 202 whose lower end normally is positioned parallel to and substantially in the plane of the top of the stack of wrappers 192. Intermediate its ends the tube 200 is provided with a slot through which extends a pin 203, the inner end of which is rigidly secured to the tube 201 and the outer end of which is attached to one end of a tension spring 204 whose other end is secured to the cross piece 166 to thereby resiliently hold the pipe 201 in a downward position. The pipe 201 at its lower end is connected as by a rubber tube 205 to a suitable source of suction in a manner to be hereinafter more particularly pointed out. To the inner side of the pipe 201 (Fig. 23) is attached a lug 206, the lower face of which is in operative engagement with one arm of a bell crank 207 rigidly secured to a shaft 208 which is journaled on the under side of the cross pieces 169—169' and whose other arm by means of a link 209 to a crank 210 which is rigidly secured to a cross shaft 211 similarly supported by the cross pieces 169—169'. To the left of shaft 211 is rigidly secured a rearwardly extending crank arm 212, whose outer end is pivotally connected by means of a rod 213 to one arm of a bell crank 214, which is journaled on a stud 215 rigidly secured to and extending outwardly from the side frame 1. The other end of the bell crank 214 is pivotally connected by a rod 216 to the lower end of a cam arm 217 whose upper end is journaled on a stud 218 extending outwardly from and rigidly secured to the side frame 1; the cam arm being provided intermediate its ends with a cam boss 219 which is adapted to be engaged by a cam pin 220 eccentrically secured to a cam 221 which is rigidly attached to the cam shaft 35 (the cam face of 221 being utilized to actuate mechanism hereinafter referred to in connection with the wrapper lifting mechanism). It will be seen from the foregoing that upon rotation of the shaft 35, motion is imparted to raise the vacuum finger 202 to lift the forward edge of the uppermost wrapper from the stack 192 (Fig. 23) and that the tension spring 204 serves to return the parts to normal position and thereby again position the vacuum finger against the next succeeding wrapper in the stack.

Separating pressure nozzles

Supported on the vertical guides 173 is a pipe 222 which supports interconnecting pipes 223—223' which carry secured to their respectively upper ends air nozzles 224—224' whose orifices extend in a direction forwardly at about a level or slightly below the lower end of vacuum finger 202. Pipe 222 is connected as by means of a rubber tube 225 to a suitable source of air pressure in a manner to be referred to more particularly following. It will therefore be seen that as the vacuum finger 202 lifts the forward edge of the wrapper, the air blasts from the nozzles 224—224' pass beneath the raised edge of the wrapper and serve to further separate the same from the stack along its forward portion.

*Wrapper lifting means*

Referring more particularly to Figs. 24, 25 (Sheets 6 and 7) and 27, 28 and 29 (Sheet 8): the vacuum cups for lifting and handling the wrappers (Figs. 24 and 25) are supported on a transversely extending pipe or conduit comprising sections 226—226' supported at its opposite ends for movement in the manner to be hereinafter described. These sections are interconnected by means of a manifold distributor 227 (see also Fig. 28) which is provided with oppositely disposed laterally extending branches 228—228' and with oppositely disposed transversely extending nipples 229—229'. To the lower face of manifold 227 is rigidly secured intermediate its ends a spring strip 230, to each the forward and rear ends of which is rigidly secured a suction cup support such as 231 having on its upper end a nipple 232 and at its lower end a rubber suction cup 233. The nipples such as 232 are connected respectively by means such as rubber hose 234 to the respective nipples 229—229'. On each side of the manifold 227 and spaced outwardly therefrom are positioned supporting blocks 236—236' (Fig. 24) which are slipped over the respective pipes 226—226' and are rigidly secured in position. Beyond these blocks and similarly secured are like blocks 235—235'. The said four blocks are provided with flat lower faces to which are secured flat springs like the springs 230, previously described, and the outer ends of each of these springs carry vacuum cups like 233, previously described. Positioned above the pipe 226—226' is a sectional conduit 237—237' which is rigidly supported from 226—226' by clamps such as 238. The conduit 237—237' is in communication with the branches 228—228' of the manifold 227 and is in communication with and supports pipe crosses (Fig. 25) 239—239' positioned respectively over the blocks 235—235', the other branches of said crosses being in communication respectively with tubes such as 234 which serve to connect the conduit 237—237' to the respective vacuum cups. Similarly, pipe tees 240—240' are supported by and in communication with the conduits 226—226' being positioned respectively over the blocks 235—235' and similarly being connected to vacuum cups on the outer arms, whereby the said cups are placed in communication with the conduit 237—237'. From the foregoing it will be seen that the various vacuum cups, comprising ten in all arranged in five pairs, are in communication with the manifold distributor 227 which, through the intermediary of pipe 226—226', is connected to a suitable source of suction as by means of the rubber tube 241.

From the foregoing it will be seen that the series of suction cups are so arranged as to receive substantially uniform pressure distribution and are flexibly mounted on the springs such as 230 so as to yieldingly adjust themselves to any reasonable irregularities in the surface of the stack of wrappers on the table 161 when the cups are lowered to contact the wrapper. The means of lowering the assembled suction cups will now be particularly described.

The ends of supply pipe 226 (Figs. 24 and 25) are respectively rotatably supported by bearings provided in blocks 242—242' suitably held from moving axially while permitting relative rotary motion between said pipe and bearings. As to certain details of construction identical to the duplicate mechanism on the left and right sides associated with the blocks 242—242', only one set of parts has been illustrated, it being understood that the prime suffix (') designates the duplicate parts in accordance with the procedure followed herein. Blocks 242—242' are rigidly secured to the upper ends of rods 243—243' (Figs. 29 and 31, Sheet 8), whose lower ends are fastened respectively, by suitable means, to plungers 244—244' slidably fitted into the bores of cylinders 245—245' and rest upon the upper ends of coiled compression springs 246—246', by which they are yieldingly pressed against plugs 247—247' which serve as heads for cylinders 245—245' and through which pass rods 243—243'. The lower ends of cylinders 245—245' are fitted over cylindrical portions 248—248' of blocks 249—249' and held rigidly thereto by means of pins. The blocks 249—249' are provided with bearings in which is rigidly attached a shaft 250, and are also provided with bearings in which a shaft 251 is rotatably fitted. Shaft 251 moves in an arc about 250 as a center. Pinned to shaft 251 on each end thereof are ends of respective crank arms 252—252' (see Figs. 30 and 31) to which are riveted respective stud pins 253—253' projecting outwardly and at right angles to respective crank arms 252—252'. Crank arms 252—252' are pivotally connected by means of links 254—254' to bearing blocks 242—242' which carry suction supply pipe 226 (see Fig. 29). Shaft 250 is supported rotatably at each end in bearings positioned in side panels 1—1' of the machine.

Means for lowering and raising suction cups will now be described. Levers 255—255' (Figs. 31 and 25) have one end pivotally fastened respectively to studs 256—256' which are bolted to respective frames 1—1'. The other ends of said levers are spring pressed against studs 253—253' and rest thereon. Pins 257—257' are fastened to said levers intermediate their ends and pivotally engage the upper ends of respective links 258—258' (see Fig. 33) whose other ends (Figs. 24 and 26) are pivotally connected respectively to crank arms 259—259' pinned to said shaft 184 (Fig. 26, Sheet 8) which, as previously described, is oscillated by cam 189 on shaft 35. It is obvious that as the high part of said cam 189 moves cam roller 188 to the right, cranks 259—259' pull links 258—258' and connected levers 255—255' down thereby pulling cranks 252—252' down which in turn pulls blocks 249—249' down against pressure of springs 246—246' (Fig. 31), and as pipe 226 is journaled in bearings of said blocks and carries the series of suction cups, that the suction cups are also pulled down and are raised to normal position by springs 246—246' when roller cam 188 rests on circular portion of cam 189 (see Fig. 26).

Means by which suction cups transfer a wrapper from stack on table to position adjacent calendar in process of being wound will now be described. Securely pinned to shaft 250 (Figs. 1, 24 and 25) outside frame 1' is a crank arm 260 resiliently held in anti-clockwise position (Figs.

1 and 6) by a spring 261, and also rigidly fastened to shaft 250 adjacent thereto is a crank arm 262 whose end is pivotally attached by a rod 263 to a crank arm 264 secured to shaft 39 outside frame 1'. As previously described (Fig. 20) shaft 39 is oscillated by cam 145. It is obvious that rotary motion of cam 145 transmits to shaft 250 an oscillating movement which causes the suction cups to be moved back and forth over an arc of approximately ninety degrees (see Fig. 36).

The means by which the wrapper is positioned adjacent gluing belt to have glue applied to one edge will now be described. Contour of face of cam 145 is so designed and the intervening mechanism so arranged as to cause the cylinders 245—245', and the vacuum cup assembly carried thereby, to travel on its upward stroke slightly past the vertical position. However, the preferred construction also requires that the suction cups descend vertically to pick up a wrapper and that said cylinders be stationary and positioned approximately vertically at the time that the suction cups are being pulled down and raised. The provision for this second requirement will now be described with reference to Figs. 25 (Sheet 7), 32 (Sheet 4) and 33 (Sheet 8). Secured rigidly to the outer cross pieces 169—169' of the table (see also Fig. 21) are the respective pivot brackets 265—265', the respective outer ends of which extend into horizontal slots 266—266' formed in bumper blocks 267—267' which are suitably held axially thereon so as to permit forward and rearward movement (see also Fig. 32). The rear ends of said bumper blocks 267—267' are provided also with respective slots 268—268', each having a horizontal and a vertical leg (Fig. 32), and through said respective slots extend the inner ends of the studs 256—256' (heretofore described) on which the rear ends of said blocks are suitably held axially while permitting horizontal as well as vertical movement, within the confines of said slots. Tension springs 269—269' normally urge said blocks forwardly so as to position their forward ends, at the limit of their forward throw, substantially in contact with the rear faces of respective cylinders 245—245' when said cylinders are in substantially a vertical position.

Directly beneath respective bumper blocks 267—267' are positioned arms 270—270' rigidly secured, intermediate their ends, to the opposite ends of a cross shaft 271 which is rotatably supported in journals 272—272' attached on frame pieces 169—169'. The rearwardly extending ends of said arms 270—270' contact the respective bumpers 267—267', and their respective forwardly extending ends are pivotally connected by downwardly extending rods 273—273' to respective cranks 274—274' (Fig. 24) rigidly secured to the cross shaft 184 heretofore described as oscillated by cam 189 (Fig. 26). When cylinders 245—245', on their upward stroke, reach substantially a vertical position they engage the respective bumpers 267—267' and are held from further movement by pins 256—256' (Fig. 32) which normally are positioned at the upper ends of the vertical leg of slot 268. While 245—245' are held vertically stationary, cam 145 continues to rotate with shaft 35, but the mechanism connecting 245—245' to cam roller 144 is stationary and during this period the face of cam 145 moves away from roller 144 but immediately bumpers 267—267' are tripped, said cam roller contacts face of its said cam. As crank arms 274—274' and rods 273—273' move down, levers 270 raise the rear ends of bumper blocks 267—267' until pins 256—256' enter the horizontal legs of slots 268—268' when spring 261 (Fig. 1) pulls said bumpers against the pressure of springs 267—267' and to the rear until pins 256—256' contact the forward ends of respective slots 266—266', thereby allowing cylinders 245—245' to reach the end of their upward stroke (see Fig. 33). When said cylinders start on their down stroke, said bumpers follow until the vertical legs of slots 268—268' are pulled down over their respectively engaged pins by springs 267.

Referring to Figs. 29 and 34: each of the bearing blocks 242—242' carries securely fastened thereto respectively downwardly extending pairs of flat springs 275—275'. Stud pins 276—276' are rigidly secured to cylinders 245—245' and project at right angles thereto and are respectively positioned adjacent the lower ends of said pairs of springs and between the lower converging springs of each pair, being spring pressed substantially equally thereby and yieldingly holding the suction cups in a plane at right angles to plane axially cutting shaft 250 and cylinders 245—245' (see also Fig. 24).

Referring more particularly to Figs. 34 and 25: cam arms 277—277' are attached rigidly to the bearing blocks 242—242', adjacent the point of attachment of respective spring arms 275—275', and extend rearwardly with their respective lower edges inclined upwardly and in operative engagement with the respective grooved rollers 278 pivotally mounted on supporting brackets 279—279' which are suitably rigidly secured to the respective side frame structures of the machine. For purposes of illustrating the location of these cam arms and rollers in plan view, they are illustrated in Fig. 25 but the supporting brackets have been omitted for purposes of clarity relative to the remaining structure. It will be understood from the foregoing that the spring arms 275—275' normally position the cam arms relative to their respective cam rollers in the position illustrated in Fig. 34, when the cylinders 245—245' are in vertical position; and that as the said cylinders are tilted rearwardly from the vertical position the cam levers ride up on the cooperating cam rollers thereby tipping the plane of the suction cup lips and the wrapper carried thereby rearwardly and upwardly (Fig. 38) so that the rear edge of the wrapper is properly positioned for the application of glue thereto in the manner to be described following.

*Means for applying glue to wrapper*

A glue fount (see Figs. 1, 35, Sheet 1, and 14, Sheet 4) is employed of the type ordinarily used by those skilled in the art. A trough 280, to hold glue, or other suitable adhesive, is supported at its respective ends by end pieces 281—281' (Figs. 24, 25) carried on brackets 282—282' secured to the side frames 1—1', said end pieces being provided with bearings into which is rotatably fitted a shaft 283 to which is rigidly pinned a fount roller 284 (Figs. 24 and 25) which is partly submerged in glue when the machine is being operated. The end pieces 281—281' preferably are made in two parts, upper and lower, clamped together by thumb screws. The upper part is removable so that glue roller 284 may be removed for convenience in cleaning both trough and roller. A scraper, fastened to the trough, one edge of which is adjacent to glue roller and extending axially its length, serves to wipe most of the glue from the roller, leaving only a light film of glue thereon. A pulley 285 is pinned to shaft 283 and is driven by a belt (not shown) from a suitable source such as power shaft 11 (Figs. 24 and 25).

Upwardly projecting extensions 287—287' of respective side frames 1—1' (Figs. 25 and 1) are provided with bearings in which a shaft 288 is rotatably journaled at its respectively opposite ends. Said shaft carries rigidly secured thereto, adjacent its supporting brackets, arms 289—289' whose forwardly extending ends freely rotatably support the axle ends of a gluing roller 290. The arms 289—289' are each made and arranged as follows (Fig. 25). The hub 291 is pinned to shaft 288 and carries a sleeve 292. The journal end 293 is provided with a stem slidably seated in sleeve 292 and having a reduced portion passing freely through a cooperating bore in end 291 and shaft 288 and provided at its outer end with a nut 294. A coiled spring (not shown) surrounds the reduced portion of the stem within the sleeve and resiliently holds the end 293 outwardly, being adjustably limited by nut 294. Thus the roller 290 is resiliently held outwardly and yieldable inwardly for purposes to be later described.

Referring to Fig. 35: to the left end of shaft 288 is fixed a crank arm 295 pivotally attached at its free end by a link 296 to the free end of a crank 297, the hub of which is rotatably fitted to stud pin 298, screwed to machine frame (see also Figs. 24 and 25). A link 299 connects, by suitable wrist pins, the free end of crank 297 and one arm of a bell crank 300, the hub of which is rotatably fitted to pin fixed in frame 1. Link 301 pivotally connects the other end of bell crank 300 with the lower end of a cam lever 302 which is pivotally supported at its upper end on stud pin 303 screwed to frame 1 and carries intermediate its ends a cam roller 304 which is spring pressed by tension spring 305 against the face of the cam 221 (Figs. 6 and 35) which is pinned to shaft 35 as previously described. It is obvious that the motion cam 221 gives to cam lever 302 when transmitted to shaft 288 causes gluing roller 290 to move in an arc about 288 as a center. At the lower end of its travel, gluing roller contacts fount roller 234 and as the latter rotates partly submerged in glue a film of glue is by this means applied to the surface of gluing roller 290 which in turn applies a film of glue to edge of a wrapper such as W (see Figs. 36 and 38). The preferable construction by which this is accomplished will now be described (see Figs. 36, 37 and 38).

The shaft ends 306—306' of a belt supporting stretcher frame, designated in its entirety as 307 (Figs. 24-25), are suitably supported in bearings provided in the extensions 287—287' of the side frames 1—1'. This belt supporting frame comprises (Fig. 37) end pieces 308—308' (see also Fig. 24) integrally attached to the respectively opposite ends of a bar 309 whose lower edge is provided with a concave groove whose cross-sectional curvature is slightly greater than a lower belt roller 301 whose ends are suitably journaled on pintles carried in countersunk bores in the end pieces 308—308'; so that when the roller is in position, its ends are concealed but freely rotatably held and its periphery is recessed in the groove of bar 309 whose opposite side faces are substantially tangential to said roller. Adjacent the uper ends of said end pieces 308—308' suitable journals pivotally support a cooperating belt roller 311, and an intermediate idle roller 312 is journaled in suitable adjustable brackets 313 carried on said end pieces. One end of the axle of the upper roller 311 extends outwardly and carries pinned thereto a ratchet wheel 314 in operative engagement with a driving pawl 315 carried by a relatively stationary part of the frame such as extension 287 of the side frame 1. An endless belt 316 surrounds the rollers 310, 312 and 311, and is held in place between the end pieces 308—308' with its lower rearmost portion passing closely over and supported by the rear face of the bar 309. The belt frame and belt carried thereby are adapted to be moved about the axis of the shaft ends 306—306', by the means to be now described. It will be seen from the foregoing that belt 316 acts as a movable platen, backed up by the bar 309; and that the wrapper edge is operated upon between the said roller and platen to apply adhesive thereto.

On the right side of the machine (Figs. 24, 25 and 1) the shaft end 306' has fixedly pinned thereto a double end crank arm 317, the forward end of which is resiliently anchored to the frame extension 287' by a helical tension spring 318, and the rear end of which is pivotally attached to the upper end of a connecting rod 319, whose lower end is pivotally attached to a piston 320 operatively positioned in a vacuum cylinder 321 which is suitably supported on the outside of frame 1' by a bracket 322 and is operatively connected, by means of a conduit such as a rubber hose 323, to the line to suction line which supplies suction to the vacuum cups 233.

A rod 324 (Fig. 36) is suitably attached by end pieces to the journal ends 293—293' of the glue roller supporting arms 289—289' so as to be positioned parallel to said roller axis approximately 45° above the forward point of the periphery of said roller on a horizontal line passing through its axis of rotation. The purpose of this rod 324 is to contact the edge of a wrapper ahead of the gluing roller and to position it against the belt to have a film of glue applied to it when contacted by gluing roller. The edge of the wrapper having been bent at approximately a right angle and held against the surface of the belt prevents the gluing roller from pulling the wrapper from its correct position as the film of adhesive is applied. When the suction cups 233 descend and rest on top of wrapper stack, the air pump creates a partial vacuum in the line which causes the wrapper to be lifted by the suction cups. As the suction chamber 321 is connected to same suction line, a partial vacuum is created in the suction chamber and the piston 320 is drawn down to bottom of chamber against the tension of spring 318, and shaft 306 is rocked by lever 318 so as to move belt 316 toward gluing roller 290 so that as the gluing roller is raised rod 324 presses the rear edge of wrapper W (see Fig. 38) against the belt 316 which in turn is pressed against plate 309. Since the gluing roller is yieldingly spring pressed by means of springs adjustably held in its supporting arms 291—291', any desired pressure of gluing roller against edge of wrapper can be obtained. As the belt 316 and its carrying frame 307 move toward the gluing roller, the ratchet wheel (Fig. 37) 314 moves with it and ratchet wheel teeth slide over the end of ratchet pawl 315, but when the parts move back to normal position the pawl engages a tooth on the ratchet wheel, and as the pawl is stationary the wheel turns and moves the belt 316 to provide a new place on the belt for the next wrapper to have a film of adhesive applied to its edge. While the gluing roller is up, the wrapper is delivered to a calendar in process of winding by opening the suction line to atmosphere and destroying partial vacuum previously created in suction cups 233 and suction chamber 321. As soon as partial vacuum is destroyed, the spring 318 draws the piston 320 upwardly and rocks shaft 306, moving the belt back to normal position and allowing the gluing roller to make a return stroke without contacting the belt or smearing adhesive thereon. It is obvious, also, that if for any reason the suction cups 233 fail to pick up a wrapper, no partial vacuum is created in cylinder of suction chamber and the belt does not move forward to contact the gluing roller and get smeared with adhesive. Small holes 325 are provided in the wrapper table (see Fig. 21) in register with the suction cups to afford opening to atmosphere for the suction cups when no wrapper is on the table.

Suction control means

Cam lever 326 (see Figs. 1 and 6) is pivotally supported on a stud bolt screwed to machine frame 1' and rests yieldingly on a cam 327 which is rigidly pinned to the cam shaft 35. A suction relief control valve 328 (see Fig. 39) is bolted to a bracket fastened to machine frame 1' and is positioned so that valve stem 329 is directly above and adjacent free end of lever 326 so that as the high part of cam 327 contacts lever, the end of the lever is raised until it contacts the valve stem and raises it against pressure of the coiled spring 329' of the valve, thereby lifting valve head 330 from its seat 331 and opening a passageway 332 connecting the suction line to atmosphere. Hose connections 333 and 334 (Figs. 1 and 30) connect valve respectively to suction side of air pump and suction cups and to suction chamber 321. Cam 327 is so positioned on shaft 35 that the valve head of valve 328 is lifted and partial vacuum in suction line destroyed, causing release of wrapper W from the suction cups at just the right moment to be engaged by the last part of the last convolution of the calendar in process of being wound (see Fig. 36). The suction hose line 241 connected to pipe line 226 is clamped to cylinder 245 by suitable means adjacent shaft 250 and moves with 245 about shaft 250 as a center. An oil trap (Fig. 30) 335 is provided in the air pressure line between air pump 336 and hose 225 which connects with air nozzles 224—224' (Fig. 21) to trap and remove any oil that might be carried from machine. A needle valve 337 is provided in suction line hose 205, which connects with the suction lifting finger 202, to regulate suction to the degree desired to raise and separate top wrapper from pile (see Figs. 21, 22 and 23).

Wrapper making means

In the device heretofore described, previously made wrappers were stacked upon the wrapper table 161. However, in the preferred embodiment of the invention the machine makes its own wrappers as a part of the cycle of its operation; and this feature of the invention will now be described. Referring more particularly to Figs. 40, 41 and 45: 1—1' designates the main side frames of the machine heretofore described, and only so much of the remaining structure heretofore described will be illustrated in these views as will be necessary to understand the cooperative relationship between the wrapper making mechanism and the previously described mechanism. Accordingly, it is to be understood that the machine heretofore described is to be utilized in its entirety with the features hereinafter to be referred to except as specifically pointed out following.

The supporting structure designated in its entirety as 337, and constructed and arranged as illustrated in the drawings, is rigidly attached to the main frames 1'—1'. The frame 337 supports table extensions 338 and 339 which are horizontally disposed in axial alignment on the respective sides of the wrapper table A161, the table A161 replacing in the previous embodiment the table 161. The table A161 and the extensions 338 and 339 are adapted to form in the present embodiment a continuous table, the wrappers as they are made being fed (Fig. 45) from the extension 339 on to the section A161 from which they are adapted to be removed by the suction cups 233 as previously described. Accordingly, the ratchet mechanism previously employed to raise the table 161 is not utilized in the present embodiment and the vertical guides for the previously described table 161 are removed from the machine. Suitable brackets 340—340' are rigidly attached to the upper extremities of frames 1—1' and support at the outer ends a track rail 341 (Fig. 43) which is slidingly engaged by shoes 342—343 which are rigidly secured to a carriage 344 which supports grippers 345—345', in general construction and operation similar to the previously described calendar feed grippers 51—51'. These grippers are adapted to be moved back and forth in the manner now to be described.

A chain 346 is rigidly attached intermediate its ends to the carriage 344 as by a clamp 347 (Fig. 45). The left end of the chain passes over an idle pulley 348, suitably journaled in a bracket supported from the frame 337, and passes downwardly around a guide pulley 349 carried on a shaft 350, suitably journaled in said frame (see also Fig. 40) and passes partially around and is attached to the periphery of a pulley wheel 351 which is rigidly secured to a driving shaft 352 suitably journaled in said frame 337 and extending between the legs of the said frames 1—1' to the other side of the frame 337, where a similar pulley wheel 351' is securely attached to said driving shaft and has secured thereto the other end of chain 346 which passes upwardly around a guide pulley 349' carried on a shaft 350', thence over an idle pulley 348' and back to its point of attachment at 347. From Fig. 40 it will be seen that the path of the chain 346 is such that it is attached at its ends to the relatively opposite faces of the pair of driving pulleys 351—351', and is so aligned by the guide and idle pulleys that as the shaft 352 is oscillated back and forth the carriage 344 is moved back and forth, and with it the grippers 345—345'. Rotary oscillatory motion is imparted to the shaft 352 by means of a sprocket 353 which is rigidly secured thereto and which is connected by a chain 354 to a driving sprocket 355 rigidly secured to a crank arm 356 and with said crank arm being freely journaled for rotary motion but held axially on an outboard end of shaft 250. The free end of the crank 356 is pivotally attached by a link 357 (see Fig. 40) to the upper end of a cam arm 358 which is pivoted intermediate its ends, as at 359, to the side frame 1' and carries at its lower end a cam roller 360 which is held against the face of a cam 361, (secured to and driven by shaft 35), as by means of a helical tension spring 362.

It will therefore be seen that as the main cam shaft 35 of the machine rotates, the grippers 345—345' are moved back and forth from the full line to the dotted line positions indicated in Fig. 45. The gripper jaws are opened and closed in proper timed relation in the manner as previously described in connection with the grippers 51—51'. In the present embodiment the jaw opening cams (such as 76; Figs. 11, 12 and 13) are actuated by shafts such as A77 (Fig. 43) to which are clamped the usual trip arms adapted to be actuated in the manner heretofore described by fixed stops 363, 364, 365 and 366 (Fig. 45) rigidly attached to and extending outwardly from the under side of the table sections 338, A161 and 339 in proper position to open each of the jaws at the proper time in the cycle of operations to be hereinafter described.

Referring more particularly to Figs. 41 and 45: it will be seen that the gripper 345' is positioned in front of the forward edge of the table section 339 which is cut back along the travel of this gripper so as to permit the wrapper web to extend forwardly beyond the said edge; the jaws of said gripper being directed rearwardly so as to grip the overhanging edge of the wrapper. It will also be seen that the gripper 345 is seated in a groove or slot (Figs. 41 and 43) provided in the table sections 338 and A161 and slides back and forth therein. It is further noted that the table sections 338 and 339 are provided with slots contiguous the respectively adjacent ends of table section A161 and extending from the front edge rearwardly to permit the cylinders 245—245' to move into proper relation to position the suction cups and cooperative mechanism to feed the wrappers from the table to the machine in the manner heretofore described.

Referring to Fig. 45: a roll of suitable paper from which to make wrappers is rotatably supported from the frame 337 as at 367 and a suitable brake mechanism (not shown) is provided to retard the rotation of the roller during the intermittent pulling of the paper therefrom in the operation of the mechanism. From the roll, the paper passes around a suitable device such as 368 to remove the curl from the paper and then passes upwardly and between a pair of coacting pressure rollers 369—370 resiliently held toward each other and suitably journaled in the frame 337, and around an idle roller 371 and over the top of table portion 339. The following provision is made for securing the pull strings to the wrapper web.

A spool of suitable string is freely rotatably supported from frame 337 as at 372 with freedom for axial movement, and the string then passes between a pair of pressure rollers 373 resiliently urged together and which serve to flatten the string to facilitate its being glued or cemented to the web of paper. From these flattening rollers the flattened string passes over a glue applying roller 374 which is in peripheral engagement with a glue feed roller mounted in the glue fountain 375 with its lower surface submerged in glue carried in said fountain; whereby a thin film of glue is applied to the said string as it passes over the roller 374. The string then passes between the rollers 369 and 370 where its under side, to which the glue has been applied, comes into contact with the upper side of the web of paper and is adhesively pressed thereagainst. The string thus attached to the web of paper is received in a peripheral groove provided in the idle roller 371, to avoid disturbing the fresh glue joint, around which the web of paper and attached string pass to the top of the table; and the upper face of the table (Figs. 42 and 46) is provided with a groove 376 to accommodate the string. Inserted in a recess in the table section 339 in the path of said groove is a heating plate 377 which carries a grooved section 376a in axial alignment with the groove formed in the face of the table 339. This heating plate is suitably heated, preferably by electricity, in a manner well understood to those skilled in the art, although it is obvious that any other suitable source of heat may be utilized. This heating plate serves to dry the glue by which the string is attached to the web of paper.

A suitable cut-off mechanism, such as shears 378 (Figs. 40 and 45), is provided for cutting individual wrappers from the wrapper web. The stationary blade of the shears 378 is positioned transversely of the table section 339 and is securely fastened to one edge of the slot formed in said table so as to bring the cutting edge substantially flush with the top of said table. The free blade of said shears is pivotally attached as at 379 (Fig. 40) to a downwardly extending operating link 380 whose lower end is pivotally connected to a cam lever 381 pivotally supported as at 382 on a relatively stationary support such as 383. A suitable tension spring such as 384 urges the forward end of the lever 381 into engagement with the face of a cam 385 which is fixed to the shaft 352. The cam face is so provided that at each rotation of the shaft the jaws of the shears are quickly closed to sever a wrapper from the wrapper web, and then are separated and remain separated for the passage of the web therethrough until the next severing operation.

The following provision is made for centering the severed web on the table A161 so that it may be removed by the suction cup assembly, referring particularly to Figs. 41 and 44. The table section A161 is provided with pairs of slots 386—386' through which pass corresponding pairs of fingers 387—387' (see Fig. 44) secured to shafts 388—388' suitably journaled in brackets attached to the under side of said table section. The shaft 388 has rigidly secured thereto the crank arm 389 which is connected by a link 390 to a cooperating crank arm 391 which is rigidly secured to the shaft 211 (see also Fig. 23) which is oscillated in a manner previously described in connection with the previous embodiment. Shafts 388 and 388' carry respective pulleys rigidly secured thereto and interconnected by a crossed belt 392. The parts are so constructed and arranged that as the shaft 211 oscillates, the fingers 387—387' move from the solid line position to the dotted line position and back to the solid line position in each cycle. This assures the proper positioning of the individual wrapper in the event that it should not be accurately positioned when it is released by the feeding wrapper 345.

It will be seen from the foregoing that we have provided for lateral adjustment of the position of the chuck jaws (Fig. 5A; Sheet 1) in the machine frame by means of the collars 7 and sprockets 8; whereby calendars, or other articles being operated upon, of different widths may be handled. This adjustment in the present device provides for approximately 4" per chuck. Similarly, other parts of the machine are provided with suitable adjustments for articles of different size. For example, as pointed out, the rollers 112—113 are preferably substantially equal to the width of the article operated upon and therefore the arms 110—110' and associated parts are adjustable to provide for rollers of different lengths as desired. Likewise, by adjusting the gripper jaw trips (Fig. 45) 363, 364, 365 and 366, wrappers of different lengths may be made, as for calendars of different size or length. It is further noted that the combined register roller and bumper device 116 (Figs. 8, 9 and 36) are resiliently held by the spring 125 so as to absorb the inertia due to the momentum of the fast moving calendars fed forward by the grippers 51—51'.

An important feature of the invention is that, due to the arrangement and cooperative position of the parts, a clear space is provided for discharge of wrapper W (Fig. 36) through the machine to the floor if fed to this position when no calendar is in place to receive it, thus preventing glue from the wrapper getting on the rollers or other mechanism, and also providing for free discharge of the calendars when wound and wrapped.

The particular arrangement and operative travel of the feed grippers 51—51', in addition to accurately feeding the calendars or other articles operated upon to the winding chucks 5—5' (Fig. 5A and Fig. 6), also serve to eject a wrapped article from said chucks when said grippers are on their forward or return stroke to get the next succeeding article to be wound and wrapped. This additional function of the feed grippers 51—51' serves to positively eject the wrapped articles in the event that they do not fall by gravity from the chuck jaws 20—20' when the latter are withdrawn axially.

The extreme flexibility of the machine is further noted in connection with the wrapper making mechanism and wrapper feed table. At such times as it may be desirable not to wind and wrap articles on the machine (as when the supply of articles is inadequate for continuous performance, or for other reasons), the wrapper making mechanism may be operated; and by sucessively lowering the table A161 (Fig. 45), wrappers may be made and piled on said table for future use in connection with the operative features shown in Figs. 21, 22 and 23.

Other unique features of the machine contributing to its great flexibility will be apparent to those skilled in the art after understanding the foregoing description.

Having thus described our invention with particularity with reference to its preferred form, it will be obvious to those skilled in the art, after understanding our invention, that other changes and modifications may be made therein without departing from the spirit and scope of our invention, and we aim in the appended claims to cover such changes and modifications as are within the scope of the invention.

What we claim is:

1. In a machine for winding calendars and the like articles, the combination of a pair of oppositely disposed laterally spaced winding chucks in substantial axial alignment each having jaws operable to opened and closed position and the jaws of respective chucks being movable toward and away from each other, means common to both chucks constructed and arranged to simultaneously close and open said jaws and to move the said jaws of respective chucks toward and away from each other simultaneously, and laterally spaced feed grippers constructed and arranged to draw said articles to be wound in a substantially horizontal direction into said chuck jaws when open and in horizontal position.

2. In a machine for winding calendars and the like articles, the combination of a pair of oppositely disposed laterally spaced winding chucks in substantial axial alignment each having jaws operable to opened and closed position and the jaws of respective chucks being movable toward and away from each other, means common to both chucks constructed and arranged to simultaneously close and open said jaws and to move the said jaws of respective chucks toward and away from each other simultaneously, means affording adjustment of the lateral spacing of said chucks for articles of different widths, and laterally spaced feed grippers constructed and arranged to draw said articles to be wound into said chuck jaws when open and in registered position.

3. In a machine for winding calendars and the like articles, the combination of a pair of oppositely disposed laterally spaced winding chucks in substantial axial alignment each having jaws operable to opened and closed position and the jaws of respective chucks being movable toward and away from each other, means common to both chucks constructed and arranged to simultaneously close and open said jaws and to move the said jaws of respective chucks toward and away from each other simultaneously, means to continuously rotate said chucks, and laterally spaced feed grippers constructed and arranged to draw said articles to be wound in a substantially horizontal direction into said chuck jaws when open and in horizontal position.

4. In a machine for winding calendars and the like articles, the combination of a pair of oppositely disposed laterally spaced winding chucks in substantial axial alignment, laterally spaced positive action feed grippers constructed and arranged to draw said articles to be wound into said chuck jaws when open and in horizontal position.

5. In a machine for winding calendars and the like articles, the combination of winding means, laterally spaced feed grippers for feeding said articles to said winding means, said grippers being reciprocable toward and away from said winding means and providing jaws to grasp the said article to be wound, and means to reciprocate said grippers and operate said jaws to grasp said article when said grippers are substantially at rest at the end of a reciprocation and to release said article when in motion with said article positioned in register with said winding means.

6. In a machine for winding calendars and the like articles, the combination of winding means, laterally spaced feed grippers for feeding said articles to said winding means, said grippers providing jaws to grasp the said article to be wound, said gripper jaws being arranged in pairs each of which comprises one plain jaw and one hooked end jaw whose hooked end extends beyond the end of said plain jaw, whereby articles with and without binding strips may be operated upon, and means to operate said jaws to grasp said article.

7. In a machine for winding calendars and the like articles, the combination of winding means, laterally spaced feed grippers for feeding said articles to said winding means, said grippers providing jaws to grasp the said article to be wound, said gripper jaws being arranged in pairs each of which comprises one plain jaw and one hooked end jaw whose hooked end extends beyond the end of said plain jaw, and means operable when said jaws are opened to urge the said article operated upon away from said hooked end to thereby release said article from dragging engagement with the said hooked end jaw, and means to operate said jaws to grasp said article.

8. In a machine for winding calendars and the like articles, the combination of a pair of laterally spaced substantially axially aligned winding means constructed and arranged to engage an article at respectively opposite sides adjacent a marginal edge thereof, feeding means constructed and arranged to engage said marginal edge of an article intermediate said winding means, and means to reciprocate said feeding means to deliver said marginal edge adjacent said winding axis intermediate its path of reciprocation in one direction and to engage said wound article intermediate its path of reciprocation in the other direction, whereby said feeding means serves the dual purpose of delivering an article to be wound and of ejecting said wound article before feeding a succeeding article to be wound.

9. In a machine for winding calendars and the like articles, the combination of a pair of laterally spaced substantially axially aligned winding means constructed and arranged to engage an article at respectively opposite sides adjacent a marginal edge thereof, a pair of spaced apart feeding means constructed and arranged to engage said marginal edge of an article intermediate said winding means, registering means positioned between said pair of feeding means to operatively align said marginal edge in register with said winding means, and means to operate said feeding means to deliver said marginal edge against said registering means.

10. In a machine for winding calendars and the like articles, the combination of a pair of laterally spaced substantially axially aligned winding means constructed and arranged to engage an article at respectively opposite sides adjacent a marginal edge thereof, a pair of spaced apart feeding means constructed and arranged to engage said marginal edge of an article intermediate said winding means, registering means positioned between said pair of feeding means to operatively align said marginal edge in register with said winding means, said registering means comprising a concave face area providing forming means to shape the first turn of an article being wound and to mold wound articles to a substantially uniform diameter, and means to operate said feeding means to deliver said marginal edge against said registering means.

11. In a machine for winding calendars and the like articles, the combination of a pair of laterally spaced substantially axially aligned winding means constructed and arranged to engage an article at respectively opposite sides adjacent a marginal edge thereof, a pair of spaced apart feeding means constructed and arranged to engage said marginal edge of an article intermediate said winding means, registering means positioned between said pair of feeding means to operatively align said marginal edge in register with said winding means, said registering means comprising a concave face area providing forming means to shape the first turn of an article being wound and to mold wound articles to a substantially uniform diameter, resilient recoil means connected to said registering means to absorb the inertia of an article delivered thereagainst, and means to operate said feeding means to deliver said marginal edge against said registering means.

12. In a machine for winding calendars and the like articles, the combination of axially aligned oppositely disposed inwardly facing winding members, movable pressure rollers spaced on respectively opposite sides of said winding axis, and means for resiliently uniformly urging said rollers toward said axis simultaneously.

13. In a machine for winding calendars and the like articles, the combination of axially aligned oppositely disposed inwardly facing winding members, an upper and a lower movable pressure roller positioned on respectively opposite sides of said winding axis and substantially equally spaced therefrom and parallel thereto, said pair of rollers being substantially as long as the axial distance between said winding members, and resilient means common to said upper and lower roller for substantially uniformly urging said rollers toward said axis.

14. In a machine for winding calendars and the like articles, the combination of axially aligned oppositely disposed inwardly facing winding members, an upper and a lower movable pressure roller positioned on respectively opposite sides of said winding axis and substantially equally spaced therefrom, a compensating roller on the feed side of said winding axis and normally positioned below the line of feed of the articles to be wound, and means for moving said compensating roller toward said winding axis when said article is being wound.

15. In a machine for winding and wrapping calendars and the like articles, the combination of means for supporting an article being fed, article winding means, means for feeding an article from said support to said winding means, means for supporting a wrapper, means for moving said wrapper from said support to an adhesive applying means, said adhesive applying means, means for delivering said wrapper from said last-mentioned means to adjacent said winding means in a substantially vertical position and slightly above the said article, said parts being so constructed and arranged that the said wrapper is delivered with its glued edge uppermost and its lower edge slightly above and over the rear edge of the article being wound after said article has been partially wound and before it has been completely wound, whereby the wrapper descends by gravity with its lower edge positioned in the convolutions of the article being wound and is thereby wrapped about said article.

16. In a machine for winding and wrapping calendars and the like articles, the combination of article winding and wrapping means, means for supporting a wrapper in substantially horizontal position above and to the rear of said winding and wrapping means, adhesive applying means above said wrapper supporting means, means reciprocable in relatively transverse directions for moving said wrapper upwardly and rearwardly from said support to said adhesive applying means, and means for moving said wrapper forwardly and downwardly from said last-mentioned means to adjacent said winding means.

17. In a machine for winding and wrapping calendars and the like articles, the combination of feed support means for an article to be wound and wrapped, wrapper supporting means, means intermediate said article and wrapper support means for winding and wrapping an article, means reciprocable in relatively transverse directions for moving said wrapper upwardly and rearwardly from its said support to an adhesive applying means, said adhesive applying means, and means for delivering said wrapper forwardly and downwardly from said adhesive applying means to an article being wound for wrapping the same.

18. In a machine for winding and wrapping calendars and the like articles, the combination of article winding means, means for supporting a wrapper, suction holding means for carrying said wrapper, means for applying adhesive to an edge of said wrapper, said last-mentioned means comprising an adhesive applying roller and a cooperating platen between which and said roller the edge of the wrapper is to be positioned for adhesive application, means for moving said carrying means to deliver an edge of a wrapper carried thereby between said roller and platen, and suction means for operatively positioning said cooperating roller and platen to apply adhesive to said wrapper, said suction positioning means being interconnected with said suction holding means and so constructed and arranged that when no wrapper is engaged by said suction holding means said suction positioning means is rendered inoperative, whereby said adhesive means is rendered inoperative.

19. In a machine for winding and wrapping calendars and the like articles, the combination of article winding means, means for applying adhesive to an edge of said wrapper, said last-mentioned means comprising an adhesive applying roller and a cooperating movable platen between which and said roller the edge of the wrapper is to be positioned for adhesive application, means for moving said platen to successively present different respective areas opposite said roller, means for delivering an edge of a wrapper between said roller and platen, and means under the control of said delivery means for operatively positioning said cooperating roller and platen in adhesive applying juxtaposition.

20. In a machine for winding and wrapping calendars and the like articles, the combination of article winding and wrapping means, suction holding means having a plurality of suction cups for carrying a wrapper, means for applying adhesive to an edge of said wrapper, said last-mentioned means comprising an adhesive applying roller and a cooperating platen between which and said roller the edge of the wrapper is to be positioned for adhesive application, said platen comprising a movable belt passing around a backing member, means for moving said carrying means to deliver an edge of a wrapper carried thereby between said roller and platen, means for moving said belt to present successively fresh areas to said roller, suction means for moving said platen into operative juxtaposition to said roller, said suction moving means being interconnected with said suction cups and so constructed and arranged that when no wrapper is carried by said suction holding means said suction moving means is rendered inoperative, whereby said adhesive means is rendered inoperative, and means for delivering said wrapper to an article being wound.

21. In a machine for winding and wrapping calendars and the like articles, the combination of article winding means, means for supporting an article being fed to said winding means, means for supporting a wrapper, means for moving said wrapper from said support to an adhesive applying means, said adhesive applying means, means for moving said wrapper from said last-mentioned means to adjacent said winding means and delivering said wrapper in a substantially vertical position, said mechanism being so constructed and arranged as to afford an unobstructed space below said wrapper delivery position in which space an article being wound is positioned and through which it will fall when discharged, whereby an adhesively treated wrapper is discharged through said space free from engagement with said mechanism when no article is supplied for winding.

22. In a machine for winding and wrapping calendars and the like articles, the combination of article winding means, means for supporting an article being fed to said winding means, means for feeding said article to said winding means, means for supporting a wrapper, means for moving said wrapper from said support to an adhesive applying means, said adhesive applying means, means for moving said wrapper from said last-mentioned means to adjacent said winding means and delivering said wrapper in a substantially vertical position, said mechanism being so constructed and arranged as to afford an unobstructed space below said wrapper delivery position in which space an article being wound is positioned and through which it will fall when discharged, whereby an adhesively treated wrapper is discharged through said space free from engagement with said mechanism when no article is supplied for winding.

23. In a machine for winding and wrapping calendars and the like articles, the combination of article winding and wrapping means, means for producing individual wrappers with tear strings attached, said means including a wrapper support in substantially horizontal position above and to the rear of said winding and wrapping means, adhesive applying means above said wrapper supporting means, means for moving said wrapper from said support to said adhesive applying means, means for moving said wrapper from said last-mentioned means to adjacent said winding means.

24. In a machine for winding and wrapping calendars and the like articles, the combination of article winding and wrapping means, means for producing individual wrappers with tear strings attached, said means including a wrapper support in substantially horizontal position above and to the rear of said winding and wrapping means, adhesive applying means above said wrapper supporting means, means for moving said wrapper from said support to said adhesive applying means, means for moving said wrapper from said last-mentioned means to adjacent said winding means and being so constructed and arranged as to deliver said wrapper with its glued edge uppermost and with its opposite edge suspended below said glued edge and positioned above the article being wound.

ALBERT B. CARR.
ROBERT H. FLUKER.